(12) United States Patent
Awano et al.

(10) Patent No.: US 9,693,218 B2
(45) Date of Patent: *Jun. 27, 2017

(54) MOBILITY MANAGEMENT SYSTEM, MOBILITY MANAGEMENT METHOD, ACCESS GW APPARATUS, MOBILITY MANAGEMENT CONTROL APPARATUS, AND COMPUTER-READABLE MEDIUM

(71) Applicant: NEC Corporation, Tokyo (JP)

(72) Inventors: Jun Awano, Tokyo (JP); Marco Liebsch, Heidelberg (DE); Stefan Schmid, Heidelberg (DE)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,359

(22) Filed: Apr. 14, 2016

(65) Prior Publication Data

US 2016/0255491 A1 Sep. 1, 2016

Related U.S. Application Data

(63) Continuation of application No. 14/002,342, filed as application No. PCT/JP2011/006316 on Nov. 11, 2011, now Pat. No. 9,344,874.

(30) Foreign Application Priority Data

Mar. 15, 2011 (JP) ................................. 2011-056243

(51) Int. Cl.
*H04W 8/12* (2009.01)
*H04W 76/04* (2009.01)
(Continued)

(52) U.S. Cl.
CPC ............... *H04W 8/12* (2013.01); *H04W 8/02* (2013.01); *H04W 76/04* (2013.01); *H04W 80/04* (2013.01)

(58) Field of Classification Search
None
See application file for complete search history.

(56) References Cited

U.S. PATENT DOCUMENTS 9,113,363 B2 8/2015 Awano
2008/0256220 A1* 10/2008 Bachmann .............. H04W 8/04
709/222
(Continued)

FOREIGN PATENT DOCUMENTS

CN 101310484 A 11/2008
CN 101601204 A 12/2009
(Continued)

OTHER PUBLICATIONS

U.S. Notice of Allowance dated Jan. 19, 2016 in U.S. Appl. No. 14/002,342.
(Continued)

*Primary Examiner* — Edan Orgad
*Assistant Examiner* — Saumit Shah
(74) *Attorney, Agent, or Firm* — McGinn IP Law Group, PLLC

(57) ABSTRACT

A mobility management system in which mobility management for a mobile terminal is performed, including a plurality of mobility anchor nodes configured to communicate with an external network; an access gateway configured to communicate with the mobile terminal and the plurality of anchor nodes, and configured to send, to at least one of the mobility anchor nodes, a packet being relayed between the mobility terminal and the external network; and a control unit having at least one hardware processor configured to execute modules to control the access gateway to switch a destination mobility anchor node of the packet.

8 Claims, 24 Drawing Sheets

(51) Int. Cl.
*H04W 8/02* (2009.01)
*H04W 80/04* (2009.01)

(56) References Cited

U.S. PATENT DOCUMENTS

| | | |
|---|---|---|
| 2008/0285518 A1 | 11/2008 | Dutta |
| 2009/0279452 A1 | 11/2009 | Akiyoshi |
| 2010/0040021 A1 | 2/2010 | Aso |
| 2010/0085978 A1 | 4/2010 | Ramankutty et al. |
| 2010/0177686 A1 | 7/2010 | Abeille |
| 2010/0296443 A1 | 11/2010 | Hirano et al. |
| 2011/0058517 A1 | 3/2011 | Yoshiuchi |
| 2011/0122815 A1 | 5/2011 | Velev |
| 2012/0214492 A1* | 8/2012 | Mihaly ............... H04W 76/041 455/437 |

FOREIGN PATENT DOCUMENTS

| | | |
|---|---|---|
| EP | 2 293 607 A2 | 3/2011 |
| JP | 2010-541303 A | 12/2010 |
| WO | WO 2008/072660 A1 | 6/2008 |
| WO | WO 2009/041051 A2 | 4/2009 |
| WO | WO 2010/016241 A1 | 2/2010 |
| WO | WO 2010/097445 A1 | 9/2010 |
| WO | WO 2010/146816 A1 | 12/2010 |
| WO | WO 2011/001594 A1 | 1/2011 |

OTHER PUBLICATIONS

Chinese Office Action dated Dec. 4, 2015 with an English translation thereof.
Mathias Fischer et al. "A Distributed IP Mobility Approach for 3G SAE", Personal, Indoor and Mobile Radio Communications, 2008, PIMRC 2008, IEEE 19$^{TH}$ International Symposium on, IEEE, Piscataway, NJ, USA. (Sep. 15, 2008).
Extended European Search report dated Dec. 2, 2014.
Leung, et al., RFC 5563 "WiMAX Forum / 3GPP2 Proxy Mobile IPv4", IETF (Internet Engineering Task Force), Feb. 2010.
Gundavelli, et al., RFC5213 "Proxy Mobile IPv6", IETF, Aug. 2008.
3GPP TS 29.060 V9.5.0 (Dec. 2010) "General Packet Radio Service (GPRS); GPRS Tunnelling Protocol (GTP) across the Gn and Gp interface", 3GPP (3rd Generation Partnership Project), Dec. 2010.
Korhonen, et al., Internet-Draft "Runtime LMA Assignment Support for Proxy Mobile IPv6" (draft-ietf-netext-redirect-04.txt), IETF, Sep. 2010.
International Search Report dated Dec. 6, 2011 (with English translation thereof).

* cited by examiner

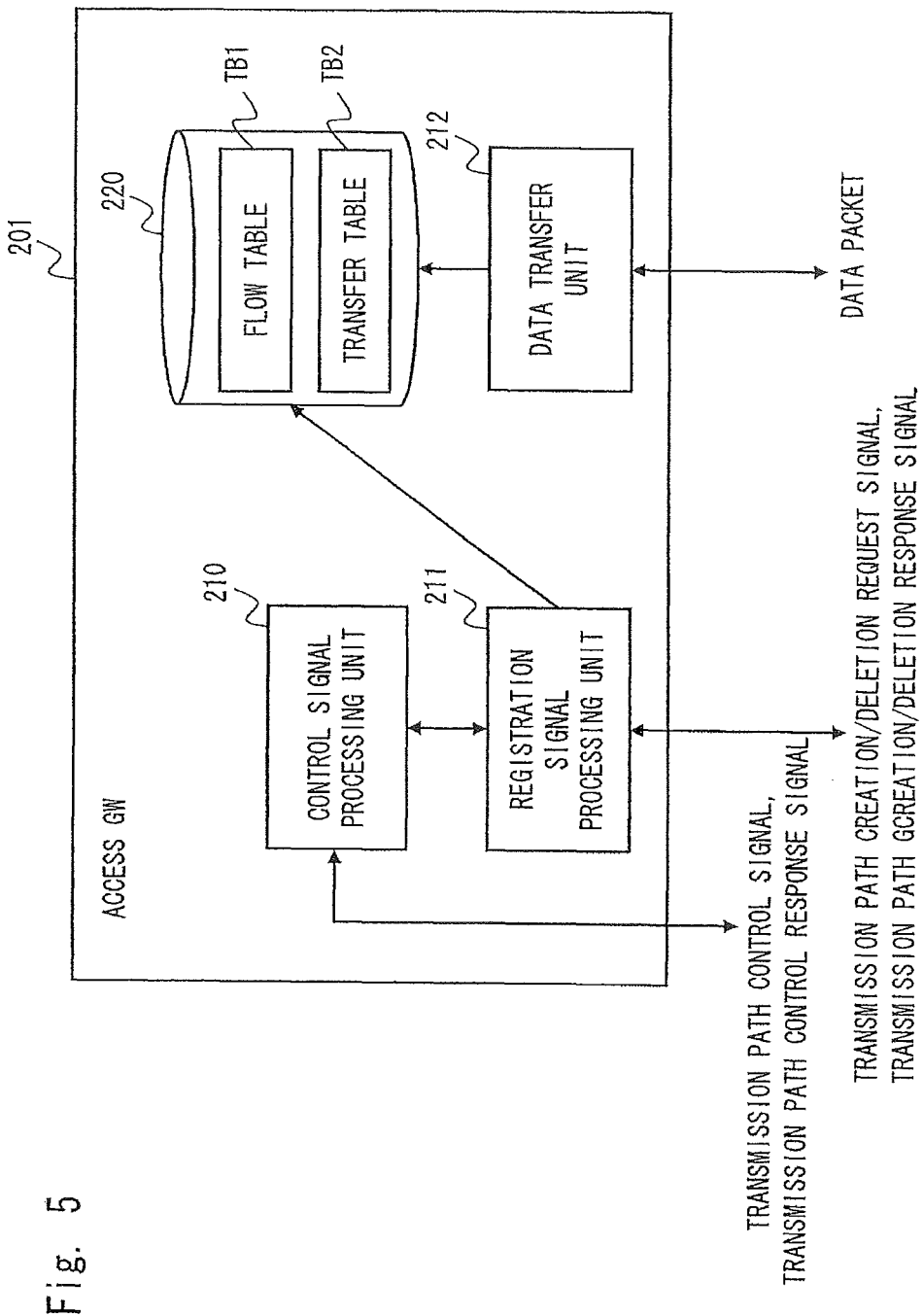

| |
|---|
| TERMINAL IDENTIFIER |
| SOURCE TRANSMISSION PATH INFORMATION |
| TARGET TRANSMISSION PATH INFORMATION #1 |
| TRANSMISSION PATH OPERATION INFORMATION #1 (FOR TARGET TRANSMISSION PATH INFORMATION #1) |
| TRANSMISSION PATH OPERATION INFORMATION #2 (FOR TARGET TRANSMISSION PATH INFORMATION #1) |
| ⋮ |
| TARGET TRANSMISSION PATH INFORMATION #2 |
| TRANSMISSION PATH OPERATION INFORMATION #1 (FOR TARGET TRANSMISSION PATH INFORMATION #2) |
| TRANSMISSION PATH OPERATION INFORMATION #2 (FOR TARGET TRANSMISSION PATH INFORMATION #2) |
| ⋮ |

Fig. 6

FLOW TABLE TB1

| TERMINAL ID | PRIMARY-FLOW SELECTOR | FLOW SELECTOR | FLOW ID | PRIORITY | BINDING ID |
|---|---|---|---|---|---|
| MN1_ID | MN1_ADDR | ANY | 1 | 255 | 1 |
| MN2_ID | MN2_ADDR1 | {SRC_IP=MN2_ADDR1, DST_IP=ANY, PROTOCOL=TCP, SRC_PORT=ANY, DST_PORT=ANY} | 1 | 1 | 2 |
| | MN2_ADDR2 | {SRC_IP=MN2_ADDR2, DST_IP=SERVER A, PROTOCOL=UDP, SRC_PORT=ANY, DST_PORT=ANY} | 2 | 255 | 1, 2 |
| ... | ... | ... | ... | ... | ... |

Fig. 7

TRANSFER TABLE TB2

| TERMINAL ID | BINDING ID | TERMINAL ADDRESS | ANCHOR ADDRESS | PATH ID |
|---|---|---|---|---|
| MN1_ID | 1 | MN1_ADDR | ANCHOR1_ADDR | SID_1 (e.g. TEID, GRE_KEY) |
| MN2_ID | 1 | MN2_ADDR | ANCHOR2_ADDR | SID_2 |
|  | 2 | MN2_ADDR | ANCHOR3_ADDR | SID_3 |
| ⋮ | ⋮ | ⋮ | ⋮ | ⋮ |

Fig. 8

TRANSMISSION PATH INFORMATION TABLE TB3

| TERMINAL ID | TERMINAL ADDRESS | ACCESS GW ADDRESS | DATA PATH INFORMATION | | | |
| --- | --- | --- | --- | --- | --- | --- |
| | | | ANCHOR ADDRESS | PATH ID | FLOW SELECTOR | PRIORITY |
| MN1_ID | MN1_ADDR | AGW1_ADDR | ANCHOR1_ADDR | SID_1 | ANY | 255 |
| ... | ... | ... | ... | ... | ... | ... |

Fig. 11

TRANSMISSION PATH INFORMATION TABLE TB3

| TERMINAL ID | TERMINAL ADDRESS | ACCESS GW ADDRESS | DATA PATH INFORMATION ||||
|---|---|---|---|---|---|---|
| | | | ANCHOR ADDRESS | PATH ID | FLOW SELECTOR | PRIORITY |
| MN1_ID | MN1_ADDR | AGW1_ADDR | NEW_ANCHOR_ADDR | SID_NEW | ANY | 255 |
| ... | ... | ... | ... | ... | ... | ... |

Fig. 12

TRANSMISSION PATH INFORMATION TABLE TB3

| TERMINAL ID | TERMINAL ADDRESS | ACCESS GW ADDRESS | DATA PATH INFORMATION | | | |
|---|---|---|---|---|---|---|
| | | | ANCHOR ADDRESS | PATH ID | FLOW SELECTOR | PRIORITY |
| MN1_ID | MN1_ADDR | AGW1_ADDR | NEW_ANCHOR_ADDR | SID_NEW | DEST_PORT=5004, UDP | 1 |
| | | | ANCHOR1_ADDR | SID_1 | ANY | 255 |
| ... | ... | ... | ... | ... | ... | ... |

Fig. 13

FLOW TABLE TB1

| TERMINAL ID | PRIMARY-FLOW SELECTOR | FLOW SELECTOR | FLOW ID | PRIORITY | BINDING ID |
|---|---|---|---|---|---|
| MN1_ID | MN1_ADDR | ANY | 1 | 255 | 1 |
| | MN1_ADDR | DST_PORT=80, PROTOCOL=TCP | 2 | 1 | 2 |
| MN2_ID | MN2_ADDR1 | [SRC_IP=MN2_ADDR1, DST_IP=ANY, PROTOCOL=TCP, SRC_PORT=ANY, DST_PORT=ANY] | 1 | 1 | 2 |
| | MN2_ADDR2 | [SRC_IP=MN2_ADDR2, DST_IP=SERVER A, PROTOCOL=UDP, SRC_PORT=ANY, DST_PORT=ANY] | 2 | 255 | 1, 2 |
| ... | ... | ... | ... | ... | ... |

Fig. 19

TRANSFER TABLE TB2

| TERMINAL ID | BINDING ID | TERMINAL ADDRESS | ANCHOR ADDRESS | PATH ID |
|---|---|---|---|---|
| MN1_ID | 2 | MN1_ADDR | ANCHOR2_ADDR | SID_2 |
| | 1 | MN1_ADDR | ANCHOR1_ADDR | SID_1 |
| MN2_ID | 1 | MN2_ADDR | ANCHOR2_ADDR | SID_2 |
| | 2 | MN2_ADDR | ANCHOR3_ADDR | SID_3 |
| ⋮ | ⋮ | ⋮ | ⋮ | ⋮ |

Fig. 20

TRANSMISSION PATH INFORMATION TABLE TB3

| TERMINAL ID | TERMINAL ADDRESS | ACCESS GW ADDRESS | DATA PATH INFORMATION ||||
| | | | ANCHOR ADDRESS | PATH ID | FLOW SELECTOR | PRIORITY |
|---|---|---|---|---|---|---|
| MN1_ID | MN1_ADDR | AGW1_ADDR | ANCHOR2_ADDR | SID_2 | DEST_PORT=80, TCP | 1 |
| | | | ANCHOR1_ADDR | SID_1 | ANY | 255 |
| ... | ... | ... | ... | ... | ... | ... |

Fig. 21

TRANSFER TABLE TB2

| TERMINAL ID | BINDING ID | TERMINAL ADDRESS | ANCHOR ADDRESS | PATH ID | ALTERNATIVE ADDRESS |
|---|---|---|---|---|---|
| MN1_ID | 1 | MN1_ADDR | ANCHOR1_ADDR | SID_1 | NONE |
| ⋮ | ⋮ | ⋮ | ⋮ | ⋮ | ⋮ |

Fig. 23

TRANSFER TABLE TB2

| TERMINAL ID | BINDING ID | TERMINAL ADDRESS | ANCHOR ADDRESS | PATH ID | ALTERNATIVE ADDRESS |
|---|---|---|---|---|---|
| MN1_ID | 2 | MN1_ADDR | ANCHOR2_ADDR | SID_2 | MN1_ALTADDR |
|  | 1 | MN1_ADDR | ANCHOR1_ADDR | SID_1 | NONE |
| ⋮ | ⋮ | ⋮ | ⋮ | ⋮ | ⋮ |

Fig. 24

MOBILITY MANAGEMENT SYSTEM, MOBILITY MANAGEMENT METHOD, ACCESS GW APPARATUS, MOBILITY MANAGEMENT CONTROL APPARATUS, AND COMPUTER-READABLE MEDIUM

CROSS-REFERENCE TO RELATED APPLICATIONS

The present application is a Continuation Application of U.S. patent application Ser. No. 14/002,342, filed on Aug. 29, 2013, which is based on Japanese Patent Application No. 2011-056243 filed on Mar. 15, 2011, the entire contents of which are hereby incorporated by reference.

TECHNICAL FIELD

The present invention relates to a mobile communication system that, when a mobile terminal connects with a network including at least one access GW (Gateway), implements mobile communication by registering, into a mobility anchor, an association between an identifier of the mobile terminal (terminal identifier), which is invariable regardless of a movement of the mobile terminal between at least one access GW, and information of an access GW used as a transfer destination of packets addressed to the mobile terminal. The mobility anchor provides an anchor function, and transfers data packets received from an external network and addressed to the mobile terminal to the access GW based on a pre-registered association between a terminal identifier and access GW information. In particular, the present invention relates to a method for switching, during data communication between a mobile terminal and a corresponding node (CN), a mobility anchor that transfers packets relating to that data communication.

BACKGROUND ART

FIG. 1 is a schematic diagram of a network-based mobility management system. The network-based mobility management system shown in FIG. 1 includes a mobility anchor 100, an access gateway (access GW) 200, and a mobile terminal 400. In the network-based mobility management system, a node disposed in a network 10, such as the access GW 200, performs mobility management for the mobile terminal 400 in behalf of the mobile terminal 400. In contrast to this, a mobile communication system in which the mobile terminal 400 itself takes part in the mobility management for the mobile terminal 400 is called "host-based mobility management system". An example of the network-based mobility management system is a system adopting PMIPv6 (Proxy Mobile IPv6). Meanwhile, an example of the host based mobility management system is a system adopting MIPv6 (Mobile IPv6). In this specification, the term "mobility management system" means the network-based mobility management system unless otherwise specified.

As shown in FIG. 1, the mobility anchor 100, the access GW 200, and a mobility management node 300 are disposed in the network 10. A corresponding node (CN) 500 disposed in an external network 20 is an apparatus that performs data communication with the mobile terminal 400. The CN 500 provides service through a network, such as WEB service, to the mobile terminal 400. The CN 500 is not included in the mobility management system and does not take part in the mobility management.

In the mobility management system shown in FIG. 1, the access GW 200 registers, into the mobility anchor 100, a terminal identifier of the mobile terminal 400 and information of the access GW 200 that is used as a transfer destination of data packets addressed to the mobile terminal 400. The mobility anchor 100 transfers the data packets, sent from the CN 500 and addressed to the mobile terminal 400, to the access GW 200 to which the mobile terminal 400 belongs (i.e., the movement destination of the mobile terminal 400) by using the registration of the association between the terminal identifier and the access GW information (which is hereinafter called "position registration"). In this way, even when the mobile terminal 400 moves between access GWs 200, the mobile terminal 400 can communicate continuously. An address of the mobile terminal 400 is, for example, used as the terminal identifier of the mobile terminal 400. An address of the access GW 200 is, for example, used as the information of the access GW 200 which is the transfer destination of data packets. Further, a tunneling technique is, for example, used for transferring data packets between the mobility anchor 100 and the access GW 200.

In the mobility management system shown in FIG. 1, PMIPv4 (Proxy Mobile Internet Protocol version 4) or PMIPv6 (Proxy Mobile Internet Protocol version 6) standardized in IETF (Internet Engineering Task Force) is, for example, used as a protocol for implementing the position registration of the mobile terminal 400. Alternatively, other protocols such as GTP (General Packet Radio Service (GPRS) Tunnelling Protocol) standardized in 3GPP (Third Generation Partnership Project) can be used. With regard to PMIPv4, PMIPv6 and GTP, please refer to Non-patent literatures 1, 2, and 3 respectively. Basically, all of these mobility management protocols specify operations in accordance with the above-described mobility management method, though they have some differences in terms of signal formats, information included in signals, and tunneling scheme for transferring data packets. Examples of mobile communication systems to which these mobility management protocols are applied include GPRS and EPS (Evolved Packet System) standardized in 3GPP. Further, the above-described mobility management protocols are also applied to mobile communication systems standardized in 3GPP2, WiMAX Forum, and so on.

For example, in EPS, the mobility anchor 100 and the access GW 200 correspond to P-GW (Packet Data Network (PDN) Gateway) and S-GW (Serving Gateway) respectively. In GPRS, the mobility anchor 100 and the access GW 200 correspond to GGSN (Gateway GPRS Support Node) and SGSN (Serving GPRS Support Node) respectively. Further, in PMIPv6, the mobility anchor 100 and the access GW 200 correspond to LMA (Local Mobility Anchor) and MAG (Mobile Access Gateway) respectively. Note that LMA and MAG in PMIPv6 mean functions on the protocol, and do not mean node names on actual communication systems.

The mobility management node 300 performs the mobility management for the mobile terminal 400 by controlling the access GW 200 in response to a request issued from the mobile terminal 400, one of the nodes on the network 10, or an apparatus having an O&M (Operation & Management) function. Specifically, the mobility management node 300 controls the access GW 200 to send signals for mobility management to the mobility anchor 100. Depending on the system, the mobility management node 300 may not be an independent node. That is, a function equivalent to the mobility management node 300 may be included, for example, in the access GW 200. In the case of EPS, the mobility management node 300 is defined as an independent node called "MME (Mobility Management Entity)". In contrast to this, in the case of GPRS, which is also in 3GPP, the function of the mobility management node 300 is incorporated into SGSN.

What is explained above is the configuration and the operation of a conventional network-based mobility management system. Here, consider a case where the mobility anchor 100 that is providing anchor service for mobile communication of the mobile terminal 400 is switched to another mobility anchor while continuing the communication of the mobile terminal 400. Detecting an abnormality in the mobility anchor 100, or performing load balancing may be used as a trigger for switching the mobility anchor 100. However, at the present moment, there is no technique for switching the mobility anchor while continuing the mobile communication in the actual systems such as 3GPP systems. In NETEXT (Network-based Mobility Extension) WG of IETF, a proposal for achieving this object in PMIPv6 has been made (see Non-patent literature 4).

Non-patent literature 4 discloses two different methods for switching the mobility anchor 100. These switching methods are briefly explained hereinafter with reference to FIGS. 2 and 3. In FIG. 2, the access GW 200 accommodating the mobile terminal 400 sends a position-registration-request signal to a mobility anchor 100A in response to a trigger of some kind (step S101). Examples of the trigger for sending a position-registration-request signal include a situation that the mobile terminal 400 connects, and a situation that a position registration has been already made for the mobility anchor 100A and the expiration time of that position registration is approaching. The position registration request includes the addresses of the mobile terminal 400 and the access GW 200. That is, by sending the position registration request, the access GW 200 requests the mobility anchor 100A to transfer data packets addressed to the mobile terminal 400 to the access GW 200.

In response to receiving the position registration request, the mobility anchor 100A performs a message exchange (signaling) with a mobility anchor 100B that substitutes for the mobility anchor 100A. In this way, the target mobility anchor 100B possesses position registration information to transfer data packets addressed to the mobile terminal 400 (step S102). After that, the mobility anchor 100A sends a position-registration-response signal containing the address of the mobility anchor 100B to the access GW 200 (step S103). By using the address of the mobility anchor 100B stored in the position-registration-response signal received from the mobility anchor 100A, the access GW 200 sets up a tunnel, which is used to transfer data packets transmitted/received from/by the mobile terminal 400, between the access GW 200 and the mobility anchor 100B (step S104). As a result, data packets transmitted/received from/by the mobile terminal 400 are transferred through the tunnel newly established between the access GW 200 and the mobility anchor 100B.

Another method for switching the mobility anchor 100 is explained with reference to FIG. 3. In the procedure shown in FIG. 3, a process for a position-registration-request signal in a step S201 is substantially same as the processes for the position registration request (step S101) and the position registration response (step S103) shown in FIG. 2. However, in the procedure shown in FIG. 3, without performing the information exchange between the mobility anchors in the step S102, the access GW 200 performs the position registration process with the mobility anchor 100B by using the address of the mobility anchor 100B contained in the position-registration-response signal (S202). After that, data packets transmitted/received from/by the mobile terminal 400 are transferred through the mobility anchor 100B in a similar manner to that in the step S104 in FIG. 2. The access GW 200 determines which of the operations shown in FIGS. 2 and 3 should be performed according to a response code that is contained, together with the address of the substitute mobility anchor 100B, in the position-registration-response signal from the mobility anchor 100A.

In the case of PMIPv6, for example, the position-registration-request signal and the position-registration-response signal described above with reference to FIGS. 2 and 3 correspond to "Proxy Binding Update" and "Proxy Binding Acknowledgement" respectively. Further, in the case of 3GPP EPS, for example, the position-registration-request signal corresponds to a default bearer establishment request message that is transmitted from S-GW to P-GW and the position registration response signal corresponds to a bearer establishment response message that is transmitted from P-GW to S-GW.

CITATION LIST

Non Patent Literature

Non-patent literature 1: Leung, et al., RFC 5563 "WiMAX Forum/3GPP2 Proxy Mobile IPv4", IETF (Internet Engineering Task Force), February 2010
Non-patent literature 2: Gundavelli, et al., RFC5213 "Proxy Mobile IPv6", IETF, August 2008
Non-patent literature 3: 3GPP TS 29.060 V9.5.0 (2010-12) "General Packet Radio Service (GPRS); GPRS Tunnelling Protocol (GTP) across the Gn and Gp interface", 3GPP (3rd Generation Partnership Project), December 2010
Non-patent literature 4: Korhonen, et al., Internet-Draft "Runtime LMA Assignment Support for Proxy Mobile IPv6" (draft-ietf-netext-redirect-04.txt), IETF, September 2010

SUMMARY OF INVENTION

Technical Problem

The method disclosed in Non-patent literature 4 makes it possible to switch a mobility anchor in a network-based mobility management system. However, there are problems when the mobility anchor switching method disclosed in Non-patent literature 4 is applied to an actual mobility management system. A first problem is that the address of the substitute mobility anchor 100B and the switching method are determined by the original mobility anchor 100. That is, in both of the two methods disclosed in Non-patent literature 4, the original mobility anchor 100A controls the process for switching a mobility anchor. However, in actual mobility management systems such as 3GPP, the mobility management node 300 plays the central role in the mobility management. Therefore, it is difficult to apply the method disclosed in Non-patent literature 4 to actual systems such as 3GPP.

A second problem in the two methods disclosed in Non-patent literature 4 is that only the switching of an anchor point between two mobility anchors is assumed. That is, the two methods disclosed in Non-patent literature 4 do not assume any situation where two mobility anchors are used simultaneously. In the examples shown in FIGS. 2 and 3, after the mobility anchor is switched, only the mobility anchor 100B can be used and the mobility anchor 100A cannot be used. However, for example, when the load on the mobility anchor 100A increases, it is conceivable that the transfer path for some of data packets is switched from the mobility anchor 100A to the mobility anchor 100B according to the type of data packets during data communication between the mobile terminal 400 and the CN 500. Further, in consideration of the differences in the function and the capacity of the mobility anchor or the external network, it is conceivable that data packets to be transmitted/received from/by the mobile terminal 400 are distributed over a plurality of mobility anchors according to their types without making the mobile terminal 400 aware of the distribution. However, the two methods disclosed in Non-patent literature 4 cannot cope with those needs.

The present invention has been made in view of these problems and an object thereof is to provide a mobility management system, a mobility management method, an access GW apparatus, a mobility management control apparatus, and a program, capable of switching a mobility anchor under the initiative of a mobility management node during data communication between a mobile terminal and a corresponding node (CN) disposed in an external network and capable of changing a mobility anchor not for the entire data packets to be transferred between the mobile terminal and the corresponding node (CN) but for a part of those data packets.

Solution to Problem

A first aspect of the present invention includes a network-based mobility management system in which mobility management for a mobile terminal is not performed by the mobile terminal but is performed on a network side. The mobility management system includes a plurality of mobility anchors, at least one access gateway, and a mobility management control unit. The plurality of mobility anchors includes first and second mobility anchors. Each of the plurality of mobility anchors is configured to transmit and receive a data packet to and from an external network. The at least one access gateway includes a first access gateway and is disposed between the mobile terminal and the plurality of mobility anchors. Further, each of the at least one access gateway is configured to transmit and receive data packets to be transferred between the mobile terminal and the external network, to and from at least one of the plurality of mobility anchors. The mobility management control unit controls switching of a mobility anchor that transfers the data packets. Further, the mobility management control unit is configured to send, to the first access gateway, a transmission-path control signal for changing a route of only a part of a data packet flow that pertains to the mobile terminal and is originally transferred through the first access gateway and the first mobility anchor, so as to be transferred through the second mobility anchor. The first access gateway is configured to (i) establish, between the first access gateway and the second mobility anchor, a logical transmission path for transferring the part of the data packet flow, in response to receiving the transmission-path control signal, and (ii) transmit the part of the data packet flow to the second mobility anchor and also transmit a remaining part of the data packet flow to the first mobility anchor by distinguishing a data packet received from the mobile terminal.

A second aspect of the present invention includes a mobility management method performed by a network-based mobility management system in which mobility management for a mobile terminal is not performed by the mobile terminal but is performed on a network side. Note that similarly to the above-described mobility management system according to the first aspect, the mobility management system relating to this aspect includes a plurality of mobility anchors including first and second mobility anchors, at least one access gateway including a first access gateway, and a mobility management control unit. The method according to this aspect includes the following steps (a) to (c):

(a) receiving, by the first access gateway from the mobility management control unit, a transmission-path control signal for changing a route of only a part of a data packet flow that pertains to the mobile terminal and is originally transferred through the first access gateway and the first mobility anchor, so as to be transferred through the second mobility anchor;

(b) establishing, by the first access gateway, between the first access gateway and the second mobility anchor, a logical transmission path for transferring the part of the data packet flow, in response to receiving the transmission-path control signal; and (c) transmitting the part of the data packet flow to the second mobility anchor from the first access gateway and also transmitting a remaining part of the data packet flow to the first mobility anchor from the first access gateway by distinguishing a data packet received from the mobile terminal.

A third aspect according to the present invention includes an access gateway apparatus used in a network-based mobility management system in which mobility management for a mobile terminal is not performed by the mobile terminal but is performed on a network side. Note that similarly to the above-described mobility management system according to the first aspect, the mobility management system, in which the access gateway apparatus according to this aspect is disposed, includes a plurality of mobility anchors including first and second mobility anchors, at least one access gateway including the access gateway apparatus, and a mobility management control unit. The access gateway apparatus according to this aspect includes a control signal processing unit, a transmission path establishment unit, and a data transfer unit. The control signal processing unit receives, from the mobility management control unit, a transmission-path control signal for changing a route of only a part of a data packet flow that pertains to the mobile terminal and is originally transferred through the first access gateway and the first mobility anchor, so as to be transferred through the second mobility anchor. The transmission path establishment unit establishes, between the access gateway apparatus and the second mobility anchor, a logical transmission path for transferring the part of the data packet flow, in response to receiving the transmission-path control signal. The data transfer unit transmits the part of the data packet flow to the second mobility anchor and also transmits a remaining part of the data packet flow to the first mobility anchor by distinguishing a data packet received from the mobile terminal.

A fourth aspect according to the present invention includes a mobility management control apparatus used in a network-based mobility management system in which mobility management for a mobile terminal is not performed by the mobile terminal but is performed on a network side. Note that similarly to the above-described mobility management system according to the first aspect, the mobility management system, in which the mobility management control apparatus according to this aspect is disposed, includes a plurality of mobility anchors including first and second mobility anchors, at least one access gateway including a first access gateway, and the mobility management control apparatus according to this aspect. The mobility management control apparatus according to this aspect includes a control signal processing unit configured to send, to the first access gateway, a transmission-path control signal for changing a route of only a part of a data packet flow that pertains to the mobile terminal and is originally transferred through the first access gateway and the first mobility anchor, so as to be transferred through the second mobility anchor.

A fourth aspect according to the present invention includes a program for causing a computer to execute the above-described mobility management method according to the second aspect of the present invention.

Advantageous Effects of Invention

According to each of the above-described aspects of the present invention, it is possible to provide a mobility management system, a mobility management method, an access GW apparatus, a mobility management control apparatus, and a program, capable of switching a mobility anchor under the initiative of a mobility management node during data communication between a mobile terminal and a corresponding node (CN) disposed in an external network and capable of changing a mobility anchor not for the entire data packets to be transferred between the mobile terminal and the corresponding node (CN) but for a part of those data packets.

BRIEF DESCRIPTION OF DRAWINGS

FIG. 5 is a block diagram showing a configuration example of an access GW according to the first embodiment;

FIG. 6 shows an illustrative format of a transmission-path control signal;

FIG. 7 shows a specific example of a flow table according to the first embodiment;

FIG. 8 shows a specific example of a transfer table according to the first embodiment;

FIG. 11 shows a specific example of a transmission-path information table according to the first embodiment;

FIG. 12 shows an example of a setting of a transmission-path information table according to the first embodiment;

FIG. 13 shows another example of a setting of a transmission-path information table according to the first embodiment;

FIG. 19 shows a state of a flow table after a series of processes by a mobility management system according to a first embodiment are completed;

FIG. 20 shows a state of a transfer table after a series of processes by a mobility management system according to a first embodiment are completed;

FIG. 21 shows a state of a transmission-path information table after a series of processes by a mobility management system according to a first embodiment are completed;

FIG. 23 shows an example of a transfer table according to the second embodiment;

FIG. 24 shows a state of a transfer table after a series of processes by a mobility management system according to the second embodiment are completed;

DESCRIPTION OF EMBODIMENTS

Specific embodiments to which the present invention is applied are explained hereinafter in detail with reference to the drawings. The same components are denoted by the same symbols throughout the drawings, and duplicated explanation is omitted as necessary for clarifying the explanation.

First Embodiment

Explanation of Configuration

Figure 1:
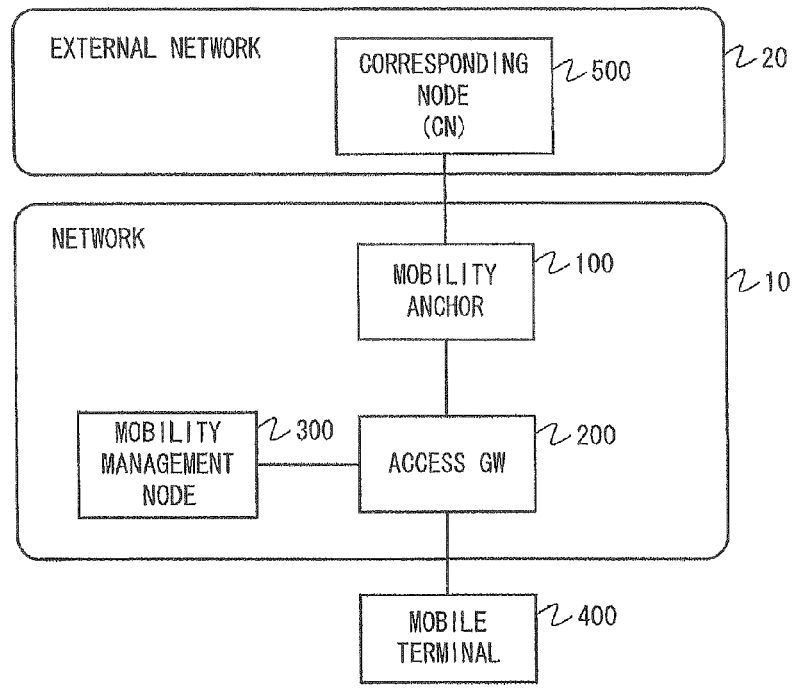
FIG. 1 is a block diagram showing a configuration example of a mobility management system in a background art.
Figure 2:
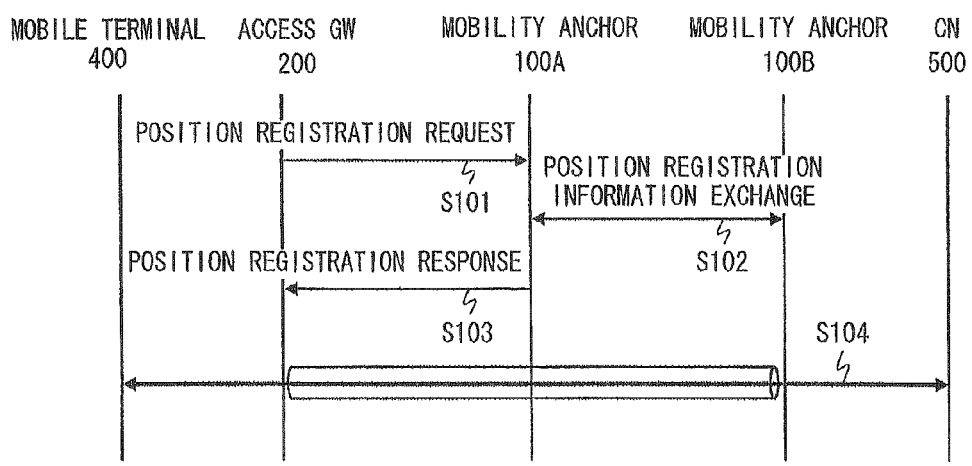
FIG. 2 is a sequence diagram showing a first pattern of a mobility anchor switching procedure in PMIPv6 described in the background-art section.
Figure 3:
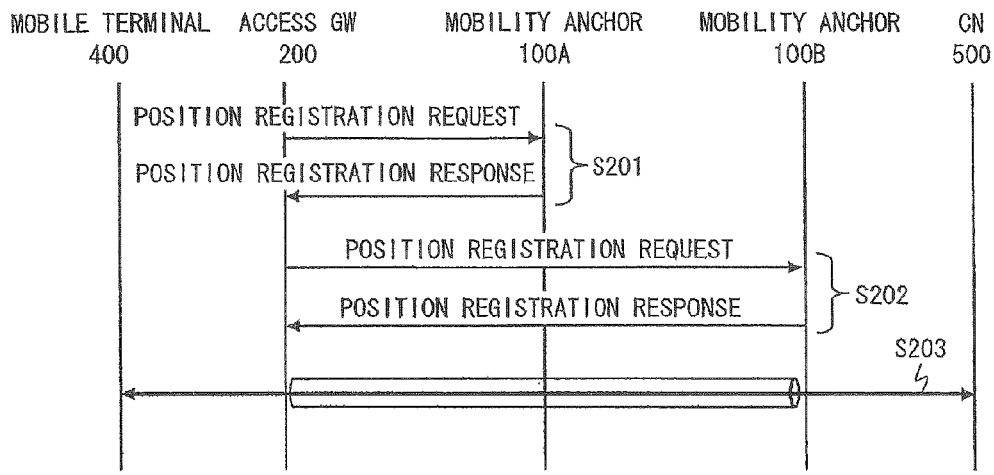
FIG. 3 is a sequence diagram showing a second pattern of a mobility anchor switching procedure in PMIPv6 described in the background-art section.
Figure 4:
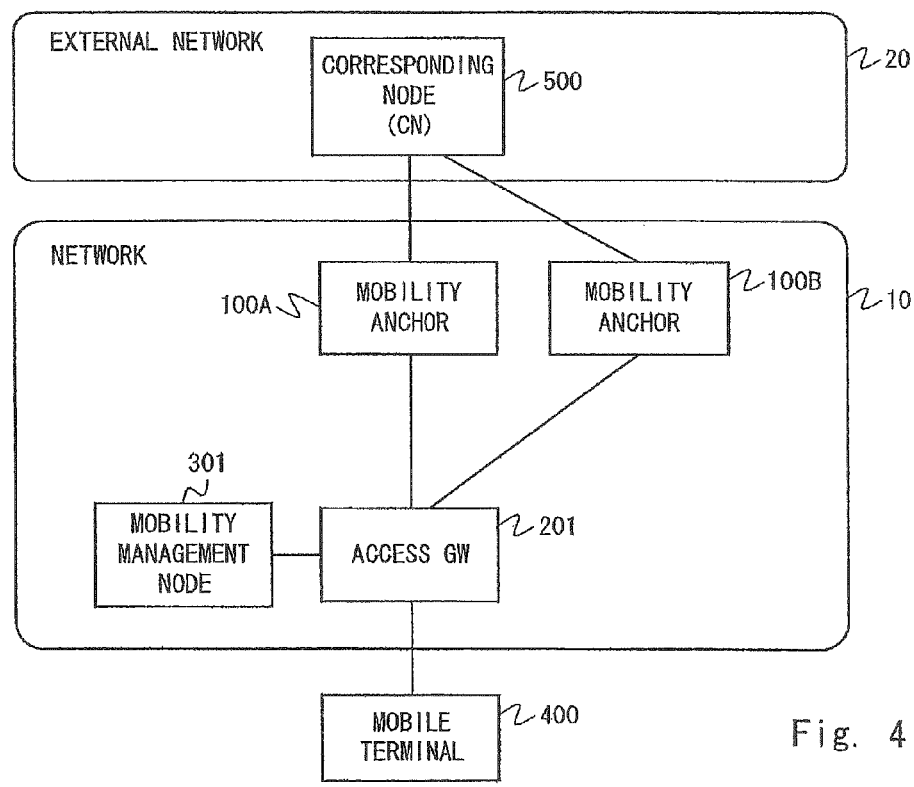
FIG. 4 is a block diagram showing a configuration example of a mobility management system according to a first embodiment.

FIG. 4 shows an example of an overall configuration of a mobility management system according to a first embodiment. This mobility management system includes mobility anchors 100, an access GW 201, and a mobility management node 301, all of which are disposed in a network 10. The network 10 relays data packets between a mobile terminal 400 and an external network 20. The network 10 is managed by an administrator or an organization such as a mobile operator. In a mobility management system specified by 3GPP, the network 10 is called "core network" and is managed and operated by a mobile operator. The external network 20 is a network of a different administrative domain from the network 10, such as the Internet. Note that the network 10 may be configured by a plurality of administrative domains. Further, a CN 500 may be disposed in the network 10 instead of in the external network 20. The mobile terminal 400 is connected to the access GW 201 principally by means of wireless technology. However, this feature is not important in the present invention and therefore its detailed explanation is omitted. Among the elements shown in FIG. 4, elements having the same functions as those shown in FIG. 1 are denoted by the same symbols. That is, the elements other than the access GW 201 and the mobility management node 301 have similar functions to those of the corresponding elements shown in FIG.
1. Detailed Explanations of these Elements are Omitted Here.

FIG. 5 shows a configuration example of the access GW 201. The access GW 201 shown in FIG. 5 includes a control signal processing unit 210, a registration signal processing unit 211, a data transfer unit 212, and a storage unit 220. The storage unit 220 stores a flow table TB1 and a transfer table TB2. For example, the storage unit 220 may be a RAM (Random Access Memory), a hard disk drive, or a combination thereof. Alternatively, the storage unit 220 may be another volatile storage device, another nonvolatile storage device, or a combination thereof. The storage unit 220 is disposed to be accessed by the registration signal processing unit 211 and the data transfer unit 212. The storage unit 220 may be disposed outside the access GW 201.

When the control signal processing unit 210 receives a transmission-path control signal from the mobility management node 301 or the like, the control signal processing unit 210 supplies transmission-path control information included in that signal to the registration signal processing unit 211. The transmission-path control information includes, for example, information shown below. The transmission-path control information, however, may include only some of the information elements listed below or may include other information element. Note that the term "transmission path" used in this specification means a logical transmission path that is established between the access GW (201) and the mobility anchor (100) and transfers data packets of the mobile terminal 400. For example, in the case of PMIPv4 and PMIPv6, this transmission path corresponds to a tunnel that is established between MAG and LMA and transfers encapsulated data packets. In the case of 3GPP GPRS and 3GPP EPS, this transmission path corresponds to a logical transmission path provided by a PDP (Packet Data Protocol) Context or a PDN (Packet Data Network) connection. Further, in the case of WiMAX, this transmission path corresponds to a tunnel established between ASN-GW (Access Service Network-Gateway) and LMA as in the case of the PMIPv4 and PMIPv6. ASN-GW corresponds to the mobility anchor 100.

FIG. 6 shows an example of transmission-path control information included in the transmission-path control signal. In the example shown in FIG. 6, the transmission-path control information includes a terminal identifier, source transmission-path information, and target transmission-path information. FIG. 6 shows an illustrative structure of the transmission-path control information in a case where the number of target transmission-path information elements is two. Information elements included in the transmission-path control information are explained hereinafter.

(1) Terminal Identifier

The terminal identifier is an identifier for identifying a mobile terminal 400. The terminal identifier is invariable regardless of a movement of the mobile terminal 400 between access GWs 201. The terminal identifier is, for example, an address (e.g., IP address) of the mobile terminal 400 or NAI (Network Address Identifier). In 3GPP systems, the terminal identifier may be IMSI (International Mobile Subscriber Identity) or MSISDN (Mobile Subscriber Integrated Services Digital Network Number). Alternatively, the terminal identifier may be a combination of IMSI of the mobile terminal 400 and an address (e.g., IP address) of the mobile terminal 400.

(2) Source Transmission-Path Information

The source transmission-path information is information to specify a transmission path to be operated in the mobility management. The source transmission-path information, for example, may be an address of a mobility anchor 101 or APN (Access Point Name). Alternatively, other identifiers may be also used if the above-described object is attained. Further, two of more of these identifiers may be used.

(3) Target Transmission-Path Information

When a transmission path is switched, the target transmission-path information is information to specify a substitute transmission path. Further, when a transmission path is duplicated, the target transmission-path information is information to specify a duplicated transmission path. Similarly to the source transmission-path information, the address of a mobility anchor or APN, for example, may be used for the target transmission-path information. Alternatively, other identifiers may be also used if the above-described object is attained. Further, two or more of these identifiers may be used. The transmission-path control information may include a plurality of target transmission-path information elements for one source transmission-path information element.

(4) Transmission-Path Operation Information

The transmission-path operation information indicates a specific process for a transmission path specified by the source transmission-path information. The transmission-path control information includes at least one transmission-path operation information element per each target transmission-path information element. Three specific examples (4A) to (4C) of the transmission-path operation information are shown below.

(4A) Flow Selector

The flow selector is information to specify a packet flow in order to operate a set of specific packets (i.e., a packet flow) flowing through a transmission path. Bearer identification information or a packet filter, for example, can be used as the flow selector. The "bearer" is a term used in 3GPP and means a logical sub-transmission path that can be configured in a PDP context or a PDN connection. The information to identify data packets transferred on a bearer, for example, may be TEID (Tunnel Endpoint Identifier) or GRE (Generic Routing Encapsulation) key. Meanwhile, the packet filter may be a source address, a destination address, a source port number, a destination port number, a protocol, a bit map (bit string), or the like. Note that when all bearers in a specific transmission path are to be operated, APN may be used as the bearer identifier information included in the flow selector. Alternatively, no bearer identification information may be included in the flow selector. Further, when there is no need to specify any object to be operated by using the packet filter, no packet filter may be included in the flow selector. Alternatively, a setting value that is supposed to be applied to every data packet, such as "*" and "Any", may be used as the packet filter included in the flow selector.

(4B) Priority

The priority indicates a priority among packet flows. The priority is used to determine a flow selector that should be preferentially evaluated when a packet flow is specified by a plurality of flow selectors. For example, a packet flow having a smaller priority value may have a higher priority.

(4C) Operation Information

The operation information designates an operation for a packet flow specified by a flow selector. Examples of specific operations include "Redirect" and "Duplicate". "Redirect" means an operation of transferring an intended packet flow to a target transmission path. On the other hand, "Duplicate" means an operation of duplicating an intended packet flow and transferring the packet flow to the target transmission path in addition to the source transmission path. Note that the operation information may designate operations other than the "Redirect" and "Duplicate". When "Redirect" is set in the operation information, the control signal processing unit 210 is requested to switch a route of a packet flow, which is transferred on a transmission path specified by source transmission-path information and is further identified by a flow selector, to a transmission path specified by target transmission-path information. In contrast to this, when "Duplicate" is set in the operation information, the control signal processing unit 210 is requested to duplicate packets belonging to a packet flow that is transferred on a transmission path specified by source transmission-path information and is further identified by a flow selector, and to transfer the duplicated packets to a transmission path specified by target transmission-path information in addition to the transmission path specified by the source transmission-path information.

Further, in response to receiving a transmission-path control result (result of creation and deletion of a transmission path) from the registration signal processing unit 211, the control signal processing unit 210 sends a transmission-path control response signal indicating the control result to the transmission source of the transmission-path control signal, such as the mobility management node 301. For example, the transmission-path control response signal includes a terminal identifier, source transmission-path information, and target transmission-path information which have been contained in the corresponding transmission-path control signal, and also includes a code indicating a result of an operation instructed by each transmission-path operation information element. The transmission-path control response signal may include only a part of these information elements, and may further include other information element.

In response to receiving the transmission-path control information from the control signal processing unit 210, the registration signal processing unit 211 searches the transfer table TB2 stored in the storage unit 220 by using the terminal identifier of the mobile terminal 400 contained in the transmission-path control information as a search key and refers to one or a plurality of transmission-path identification information elements that identifies transmission path relating to the data packet transfer of the mobile terminal. Then, the registration signal processing unit 211 compares the source and target transmission-path information elements contained in the transmission-path control information with the transmission-path identification information contained in the transfer table TB2, and thereby determines whether the creation or deletion of a transmission path(s) is necessary or not. Upon determining that the creation or deletion of a transmission path(s) is necessary, the registration signal processing unit 211 controls the creation or deletion of a transmission path(s) between the mobility anchor 100 and the access GW 201 by sending a transmission-path creation request signal or a deletion request signal to the mobility anchor 100. The transmission-path identification information contained in the transfer table TB2 uniquely specifies a transmission path, and includes, for example, the terminal identifier of the mobile terminal 400, the address of the mobility anchor, and other auxiliary identifiers. Details of the technique for determining the creation and deletion of a transmission path are described later.

The registration signal processing unit 211 sends to the control signal processing unit 210 an update result of the transfer table TB2. Further, the registration signal processing unit 211 sends, to the control signal processing unit 210, information indicating a control result contained in the response signal received from the mobility anchor 100, as a response to the transmission-path creation or deletion request signal. Furthermore, the registration signal processing unit 211 updates the contents of the flow table TB1 and the transfer table TB2 recorded in the storage unit 220 about a transmission path(s) for which there is no need for new creation or deletion and a transmission path(s) for which the success of the creation or deletion process is confirmed by the response signal from the mobility anchor 100, by using information contained in the transmission-path control information.

FIG. 7 shows an illustrative format of the flow table TB1. In the flow table TB1 shown in FIG. 7, one or a plurality of primary flow selector, flow selector, flow identifier (flow ID), priority, and binding ID are associated per terminal identifier (Terminal ID) of the mobile terminal 400. Among them, the terminal identifier of the mobile terminal 400, the flow selector, and the priority are already described above. The flow identifier identifies each flow selector. The binding ID is used as key information to retrieve necessary information from the transfer table TB2 indicating a transmission path to which packets matched with the flow selector is to be transferred and a transfer method. The primary flow selector is provided in order to make it possible to perform a rough comparison at the start. This is because matching for each received packet by using a flow selector for which a fine setting can be made requires a large processing amount and a long processing time. Therefore, although the primary flow selector is not indispensable, the primary flow selector can significantly contribute to the effective determination of a transfer destination.

Next, FIG. 8 shows an illustrative format of the transfer table TB2. In the transfer table TB2 shown in FIG. 8, one or a plurality of information elements about a transfer destination and a transfer method (hereinafter, called "transfer relevant information") are associated per terminal identifier (Terminal Address) of the mobile terminal 400. Each transfer relevant information is identified by the binding ID. The transfer relevant information includes the address of the mobility anchor 100 indicating a transfer destination (Anchor Address) and a path identifier (path ID) identifying a packet flow to be transferred through a transmission path from the mobile terminal 400 to the mobility anchor 100. In the example shown in FIG. 8, a value "SID" is shown as the path identifier. The path identifier is for example a TEID when the logical transmission path (bearer) through which a packet flow is transferred is controlled by GTP. In the case of PMIPv6 and PMIPv4, GRE key can be used as the path identifier. A value of TEID or GRE key for the transfer from the access GW 201 to the mobility anchor 100 (i.e., uplink) is generally different from a value of TEID or GRE key for the transfer from the mobility anchor 100 to the access GW 200 (i.e., downlink). It is assumed that the path identifier SID used in the transfer table TB2 shown in FIG. 8 includes therein identifiers for uplink and downlink. The path identifier included in the transfer table TB2 can be omitted depending on the situation. The transfer table TB2 may include information of QoS (Quality of Service) that should be ensured for data packets passing through the transmission path and/or other information such as information indicating a permitted bandwidth.

Next, a technique for determining the creation and deletion of a transmission path(s), performed by the registration signal processing unit 211 is explained hereinafter. The registration signal processing unit 211 compares a set of transmission paths P_req that is obtained when it is assumed that a transmission path operation specified by the transmission-path identification set contained in the transmission-path control information supplied from the control signal processing unit 210 (i.e., source transmission-path information, target transmission-path information, and transmission-path operation information), with the current set of transmission paths P_exist specified by the transmission-path identification set retrieved from the transfer table TB2 (i.e., terminal identifier, and information about a transfer destination and a transfer method). Then, when there is a transmission path(s) that is not included in the P_exist but is included in the P_req, the registration signal processing unit 211 determines to send the transmission-path creation request signal for generating that transmission path(s). On the other hand, when there is a transmission path(s) that is included in the P_exist but is not included in the P_req, the registration signal processing unit 211 determines to send the transmission-path deletion request signal for deleting that transmission path(s). For a transmission path(s) that is included in both the P_exist and the P_req, the registration signal processing unit 211 determines that neither the transmission-path creation request nor the deletion request is necessary.

In response to receiving a data packet from the mobile terminal 400, the data transfer unit 212 regards the source address of the data packet (e.g., source IP address) as the terminal identifier of the mobile terminal 400 and searches the flow table TB1 by using the retrieved terminal identifier as a key. The data transfer unit 212 compares a flow selector associated with this terminal identifier in the flow table TB1 with an IP header, a port number, data in a higher application layer, and the like included in the data packet. Then, when the flow selector retrieved from the flow table TB1 matches with information included in the data packet, the data transfer unit 212 retrieves a binding ID associated with the matched flow selector. Note that each flow selector corresponds to one binding ID or plural binding IDs.

Further, the data transfer unit 212 searches the transfer table TB2 by using the terminal identifier of the mobile terminal 400 and the binding ID retrieved from the flow table TB1 as search keys, and retrieves transfer relevant information of a matched transfer destination. When there are plural biding IDs, the data transfer unit 212 retrieves the same number of transfer relevant information elements as the number of the biding IDs. The data transfer unit 212 encapsulates the received data packet for transmitting it to the mobility anchor 100 by using the transfer relevant information retrieved from the transfer table TB2. If necessary, the data transfer unit 212 sets the path identifier such as TEID and GRE Key information in a header of the encapsulated packet. The data transfer unit 212 transmits the encapsulated data packet to the network 10. Note that when the data transfer unit 212 retrieves a plurality of transfer relevant information elements from the transfer table TB2, the data transfer unit 212 duplicates the received data packet according to the number of the transfer relevant information elements, encapsulates a plurality of duplicated data packets by using the plurality of transfer relevant information elements, and transmits the plurality of encapsulated packets to the network 10.

Furthermore, in response to receiving, from the mobility anchor 100, an encapsulated packet designating the address of the access GW 201 as the destination, the data transfer unit 212 transmits a data packet obtained by decapsulating the encapsulated packet to the mobile terminal 400. The data transfer unit 212 may check the path identifier (e.g., TEID or GRE key) added in the header of the encapsulated packet and the destination address of a packet contained in the payload of the encapsulated packet. Then, only when there is a corresponding entry in the flow table TB1, the data transfer unit 212 may transmit the data packet obtained by decapsulating the encapsulated packet to the mobile terminal 400.

Figure 10:
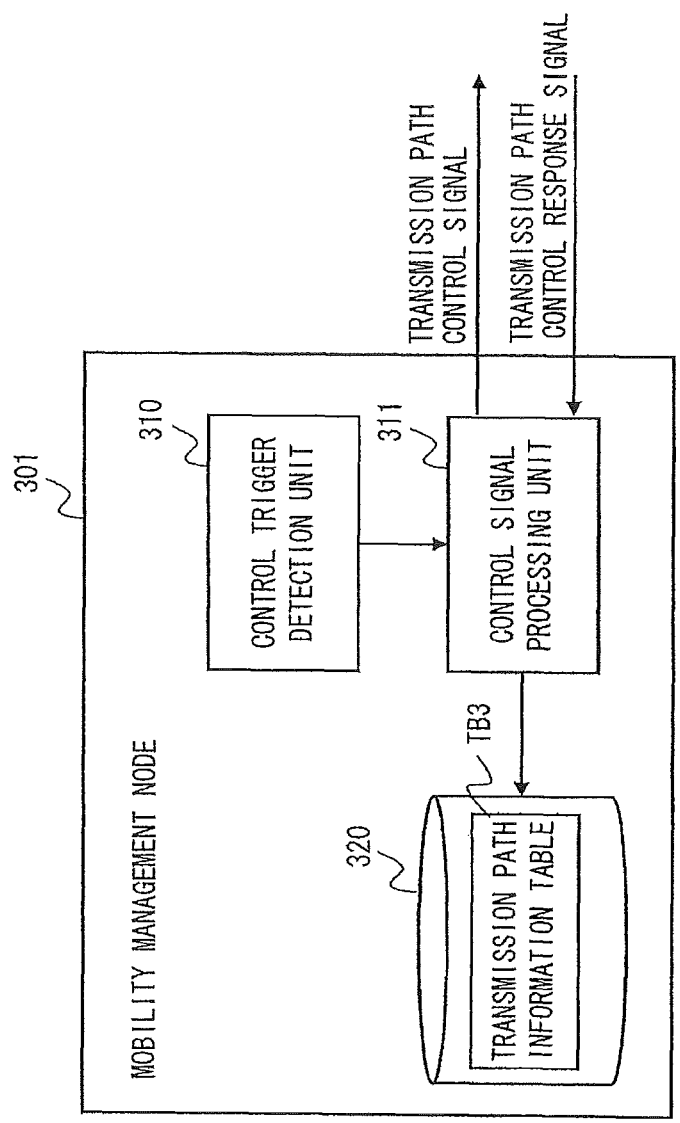
FIG. 10 is a block diagram showing a configuration example of a mobility management node according to the first embodiment.

A configuration of the mobility management node 301 according to this embodiment shown in FIG. 4 is explained hereinafter. The mobility management node 301 sends the transmission-path control signal to the access GW 201 and thereby controls the transmission path creation and deletion process and the transfer process of data packets performed by the access GW 201. FIG. 10 shows a configuration example of the mobility management node 301. In the example shown in FIG. 10, the mobility management node 301 includes a control trigger detection unit 310, a control signal processing unit 311, and a storage unit 320. The storage unit 320 stores a transmission-path information table TB3. The storage unit 320 may be a RAM (Random Access Memory), a hard disk drive, or a combination thereof. Alternatively, the storage unit 220 may be another volatile storage device, another nonvolatile storage device, or a combination thereof. The storage unit 320 is disposed to be accessed by the control signal processing unit 311. The storage unit 320 may be disposed outside the mobility management node 301.

The control trigger detection unit 310 sends a control trigger to the control signal processing unit 311 in response to satisfying some kind of internal condition or receiving a notification indicating an occurrence of some kind of event that requires transmission-path control. The control trigger triggers the control signal processing unit 311 to send the transmission-path control signal to the access GW 210. An event that can serve as the condition of the control trigger is, for example, detection of a connection of the mobile terminal 400 with the network 10, and reception of a notification indicating a failure, a sign of a failure, or a high load of the mobility anchor 100 from an external system that manages the network. Note that events that can serve as the condition of the control trigger may be other various factors.

In response to receiving the control trigger from the control trigger detection unit 310, the control signal processing unit 311 retrieves necessary information from the transmission-path information table TB3 stored in the storage unit 320 based on information included in the control trigger, generates the transmission-path control signal by using retrieved information, and sends the transmission-path control signal to an appropriate one of the access GWs 201. The address of the appropriate access GW 201 is retrieved from the transmission-path information table TB3.

FIG. 11 shows an example of the transmission-path information table TB3. In the example shown in FIG. 11, the transmission-path information table TB3 associates the following information elements (1) to (4).
(1) Terminal Identifier (Terminal ID)

As described previously, the terminal identifier identifies a mobile terminal 400. For example, in 3GPP, IMSI, MSISDN or NAI may be used as the terminal identifier. Alternatively, an address (e.g., IP address) of the mobile terminal 400 may be used as the terminal identifier.

(2) Terminal Address

The terminal address is an address (e.g., IP address) assigned to the mobile terminal 400. For example, the terminal address is assigned to the mobile terminal 400 by the mobility anchor 100 or the external network 20 when the mobile terminal 400 connects with the network 10 (i.e., one of the access GWs 201) and thereby connects with the external network 20.

(3) Access GW Address

The access GW address is an address (e.g., IP address) of the access GW 201.

(4) Transmission-Path Information (Data Path Information)

The transmission-path information includes information elements to identify a transmission path and for indicating characteristics of a transmission path. Specific examples (4A) to (4D) of the transmission-path information are shown below.

(4A) Anchor Address

The anchor address is an address (e.g., IP address) of the mobility anchor 100.

(4B) Path Identifier (Path ID)

As described previously, the path identifier is information to identify a packet flow to be transferred through a transmission path. For example, in 3GPP, TEID or GRE Key can be used as the path identifier.

(4C) Flow Selector

As described previously, the flow selector is information to specify the content of a packet flow to be transferred through the transmission path. For example, the flow selector includes source and destination addresses, source and destination port numbers, information of a higher protocol (e.g., TCP or UDP), and other information to specify a packet. In the example shown in FIG. 11, a value "Any" indicating that the packet flow is intended for every data packet is set in the flow selector.

(4D) Priority

As described previously, the priority indicates a priority among flow selectors. That is, the priority indicates which flow selector should be evaluated first when the access GW 201 compares a received data packet with a plurality of flow selectors. Here, a smaller priority value for a packet flow means a higher priority.

Note that the information elements constituting the transmission-path information table TB3 may be a part of the contents shown in FIG. 11, or may include other information. Further, in the case of 3GPP EPS, the transmission-path information table TB3 shown in FIG. 11 may be obtained by modifying the table shown in "Table 5.7.2-1: MME MM and EPS bearer Contexts" of 3GPP TS 23.401. Specifically, the transmission-path information table TB3 may be obtained by adding information element to distinguish a duplicated transmission path between the access GW 201 (in this case, S-GW) and the mobility anchor 100, and information element for specifying the original transmission path to be duplicated, into the transmission-path information (e.g., in the case of 3GPP EPS, PDN connection) contained in the table shown in "Table 5.7.2-1: MME MM and EPS bearer Contexts" of 3GPP TS 23.401.

Although the transmission-path information table TB3 is disposed in the storage unit 320 in the example shown in FIG. 10, at least part of the transmission-path information table TB3 may be stored in a database disposed outside the mobility management node 301. In such a case, the control signal processing unit 311 may retrieve information recorded in the transmission-path information table TB3 through the network 10.

When there are a plurality of access GWs 210 to which the transmission-path control signal should be sent, the control signal processing unit 311 may send a plurality of transmission-path control signal. Further, although it is assumed that one transmission-path control signal includes transmission-path control information about one mobile terminal 400 in this example, one transmission-path control signal may include transmission-path control information about a plurality of mobile terminals 400.

Information elements used to configure the transmission-path control signal by the control signal processing unit 311 depend on the nature of the occurred event. Two examples are shown below.

Example 1

A case where all data packets of the mobile terminal 400 (Terminal identifier: MN1_ID) are to be transferred through other mobility anchors 100 due to an administrative reason The control signal processing unit 311 searches the transmission-path information table TB3 by using the terminal identifier (MN1_ID) as a key and thereby retrieves the address of the mobile terminal 400 (MN1_Addr), the address of the access GW 201 (AGW1_Addr), the address of the mobility anchor 100 (Anchor1_ID), and the path identifier (SID_1) which are associated with an entry matched with the terminal identifier (MN1_ID). The control signal processing unit 311 further retrieves the address of the target mobility anchor 100 that newly accommodates the mobile terminal 400 from a database disposed outside or inside the mobility management node 301. After that, the control signal processing unit 311 generates the transmission-path control signal by using these retrieved information elements. Specific examples of information elements included in the transmission-path control signal in the example 1 are shown below.

(Structure Example of Transmission-Path Control Signal in Example 1)

Terminal identifier: MN1_ID and MN1_Addr
    Source transmission-path information: Anchor1_Addr and SID_1
    Target transmission-path information: New_Anchor_Addr (address of the target mobility anchor 100) and SID_New (path identifier of target path)
    Transmission-path operation information:
      Flow selector: "Any" (every flow)
      Priority: 255
      Operation information: "Redirect"

Example 2

A case where only part of data packets (in this example, UDP having a destination port number 5004) of the mobile terminal 400 (Terminal identifier: MN1_ID) are to be transferred through other mobility anchors 100 for a reason such as for implementing legitimate interception, special accounting, or special QoS The control signal processing unit 311 searches the transmission-path information table TB3 by using the terminal identifier (MN1_ID) as a key and thereby retrieves the address of the mobile terminal 400 (MN1_Addr), the address of the access GW 201 (AGW1_Addr), the address of the mobility anchor 100 (Anchor1_ID), and the path identifier (SID_1) which are associated with an entry matched with the terminal identifier (MN1_ID). The control signal processing unit 311 further retrieves the address of the target mobility anchor 100 that newly accommodates the mobile terminal 400 from a database disposed outside or inside the mobility management node 301. After that, the control signal processing unit 311 generates a transmission-path control signal by using these retrieved information elements. Specific examples of information elements included in the transmission-path control signal in the example 2 are shown below.

(Structure Example of Transmission-Path Control Signal in Example 2)

Terminal identifier: MN1_ID and MN1_Addr
Source transmission-path information: Anchor1_Addr and SID_1
Target transmission-path information: New_Anchor_Addr (address of the target mobility anchor 100) and SID_New (path identifier of target path)
Transmission-path operation information:
 Flow selector: "Destination port number=5004, Protocol=UDP"
 Priority: 1
 Operation information: "Redirect"

Further, in response to receiving a transmission-path control response signal, the control signal processing unit 311 updates the contents of the transmission-path information table TB3 based on information included in that signal. FIG. 12 shows the transmission-path information table TB3 that has been updated after receiving the transmission-path control response signal in a case where the transmission-path control signal is configured as shown in the above-described example 1. In FIG. 12, compared to FIG. 11, the entry having an anchor address "ANCHOR1_ADDR" and a path identifier "SID_1" relating to "MN1_ID" shown in FIG. 11 is updated to an entry having an anchor address "NEW_ANCHOR_ADDR" and a path identifier "SID_New". Similarly, FIG. 13 shows an updated transmission-path information table TB3 in a case where the transmission-path control signal is configured as shown in the above-described example 2. In FIG. 13, compared to FIG. 11, an entry having an anchor address "NEW_ANCHOR_ADDR" and a path identifier "SID_New" is newly added in FIG. 13.

The control signal processing unit 210, the registration signal processing unit 211, the data transfer unit 212, the control trigger detection unit 310, and the control signal processing unit 311 explained above can be entirely implemented by software. In other words, these functions can be implemented by causing a computer system including a processor such as a CPU (Central Processing Unit) and an MPU (Micro Processing Unit) to execute one or a plurality of programs. However, a part or the whole of these functions can be also configured by hardware.

These programs can be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

(Explanation of Operation)

Figure 14:
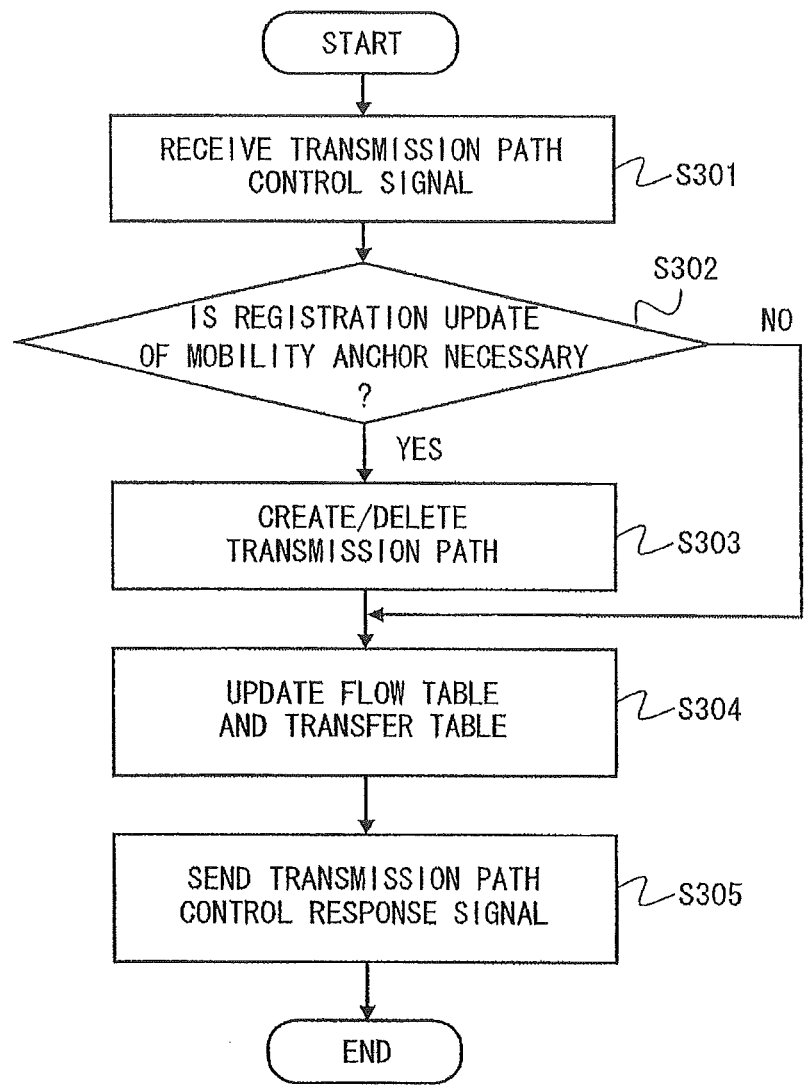
FIG. 14 is a flowchart showing an operation example that is performed when an access GW receives a transmission-path control signal according to the first embodiment.

Next, an operation of the mobility management system including the access GW 201 and the mobility management node 301 according to this embodiment is explained hereinafter in detail with reference to flowcharts and sequence diagrams. FIG. 14 is a flowchart showing an illustrative control procedure for creating and deleting a transmission path performed by the access GW 201 upon receiving the transmission-path control signal. Firstly, in a step S301, the access GW 201 receives the transmission-path control signal from the mobility management node 301. The control signal processing unit 210 sends transmission-path control information included in the transmission-path control signal to the registration signal processing unit 211.

Figure 9:
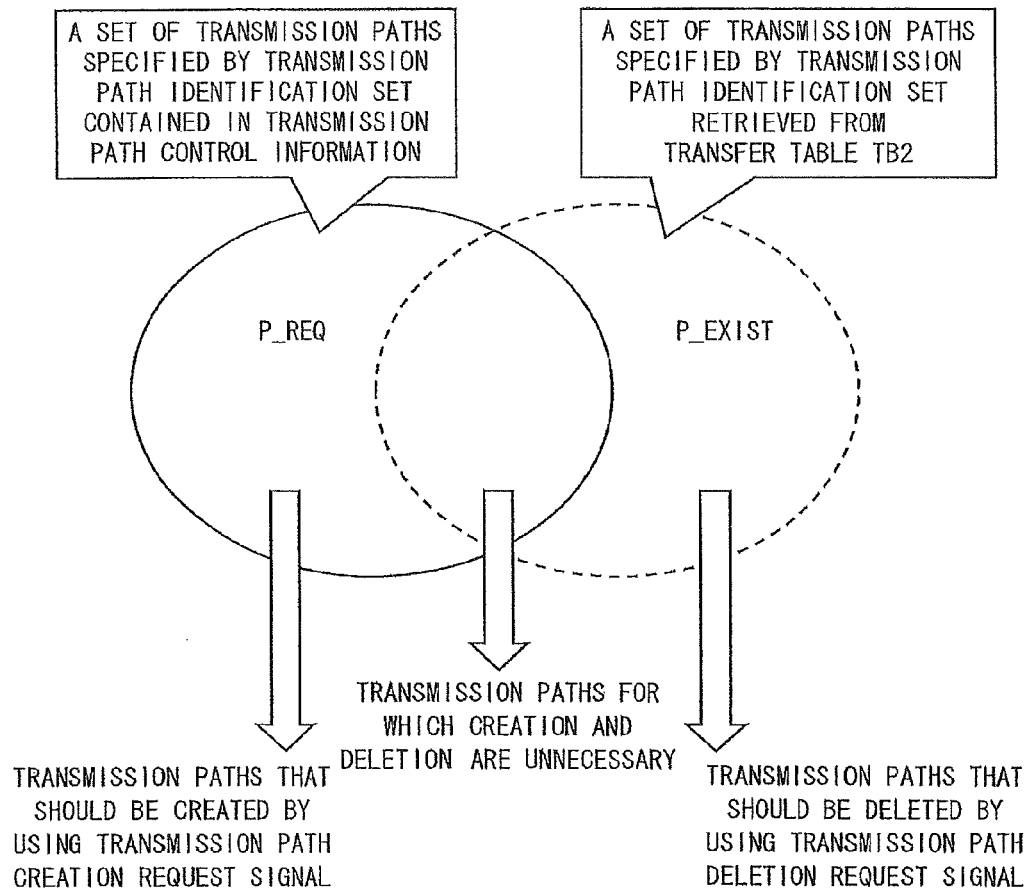
FIG. 9 is a conceptual diagram for explaining a condition for determining whether a transmission-path creation request and a deletion request should be transmitted.

In a step S302, the registration signal processing unit 211 compares a set of transmission paths (P_req) that is obtained when it is assumed that a transmission path operation specified from the transmission-path control information is performed, with the current set of transmission paths (P_exist) specified from the transfer table TB2 as explained above with reference to FIG. 9. When these two sets do not match (YES at S302), the registration signal processing unit 211 decides that control of a transmission path(s) (creation or deletion of transmission path(s)) is necessary and thus performs a process in a step S303. On the other hand, when these two sets match (NO at S302), the registration signal processing unit 211 bypasses the step S303 because the transmission-path control is unnecessary.

In a step S303, the registration signal processing unit 211 sends the transmission-path creation request signal or the deletion request signal to the mobility anchor 100 in order to create or delete a transmission path(s) between the access GW 201 and the mobility anchor 100. When the registration signal processing unit 211 receives the transmission-path creation response signal or the deletion response signal from the mobility anchor 100, the registration signal processing unit 211 notifies the control signal processing unit 210 of a result of the transmission-path control based on information contained in each response signal (e.g., whether the operation for the transmission path has succeeded or not).

In a step S304, the registration signal processing unit 211 updates the contents of the flow table TB1 and the transfer table TB2 by using information elements contained in the transmission-path control information about a transmission path(s) for which the transmission-path control result indicates success and a transmission path(s) for which there is no need for new creation or deletion.

In a step S305, the control signal processing unit 210 generates the transmission-path control response signal by using the transmission-path control result notified from the registration signal processing unit 211 and sends this transmission-path control response signal to the mobility management node 301.

Figure 15:
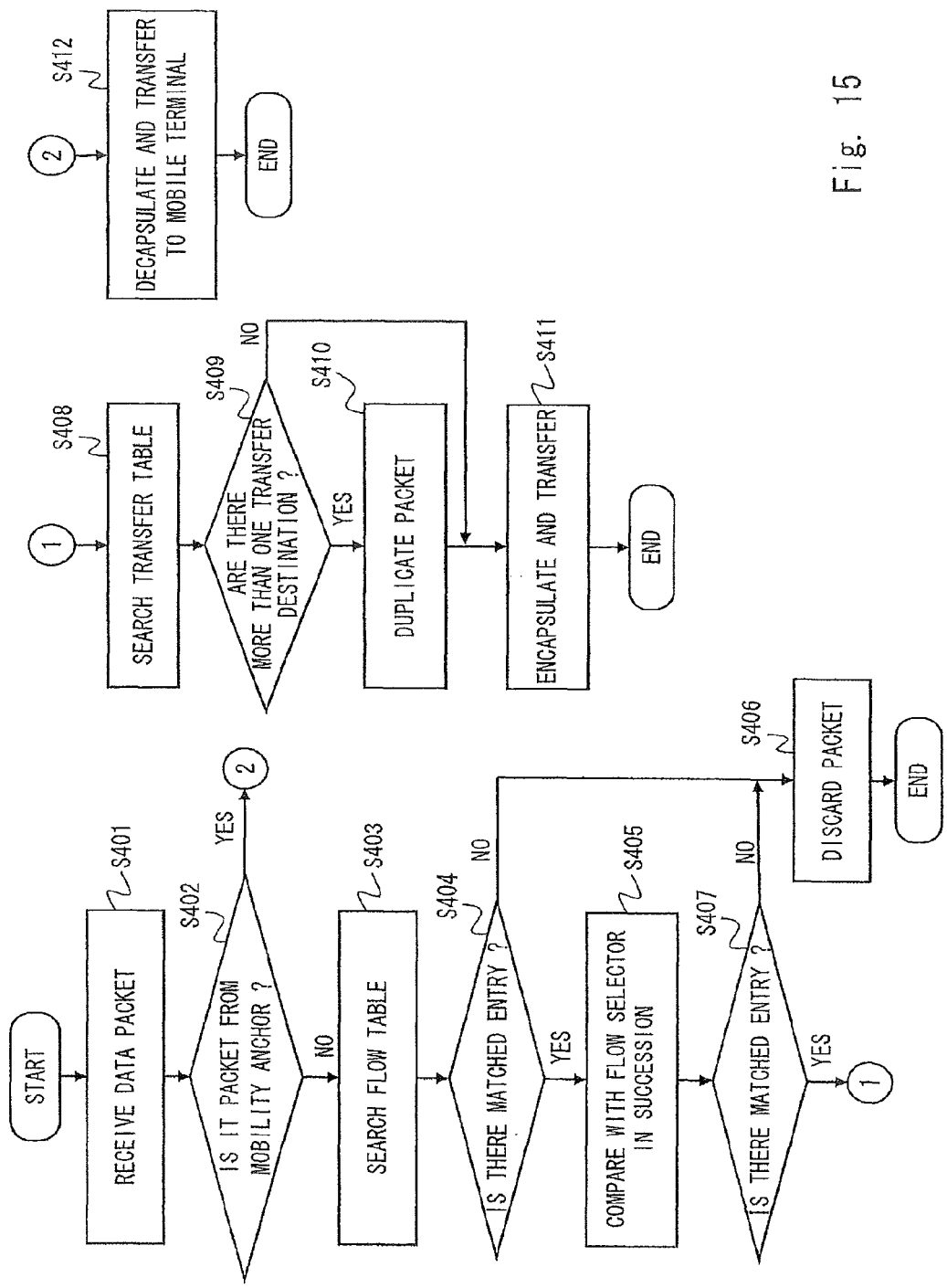
FIG. 15 is a flowchart showing an operation example that is performed when an access GW receives a data packet according to the first embodiment.

Next, an operation that is performed when the access GW 201 receives a data packet from the mobile terminal 400 is explained with reference to a flowchart shown in FIG. 15. FIG. 15 is a flowchart showing an illustrative operation performed by the access GW 201 upon receiving a data packet from the mobile terminal 400. In a step S401, the data transfer unit 212 receives a data packet. In a step S402, the data transfer unit 212 determines whether the received data packet is a encapsulated data packet sent from the mobility anchor 100 or not. When the received data packet is a encapsulated data packet arrived from the mobility anchor 100 (YES at step S402), the data transfer unit 212 performs a process in a step S412. If not so (NO at step S402), the data transfer unit 212 performs a process in a step S403. Note that whether the received data packet is a encapsulated data packet arrived from the mobility anchor 100 or not can be determined based on a fact that the destination address of the received data packet designates the address of the access GW 201 and the source address of the received data packet designates the address of the mobility anchor 100 in one of the entries recorded in the transfer table, in addition to the fact the received data packet is an encapsulated packet. For this determination, whether the destination address of the internal packet designates the terminal address in the matched entry or not may be also taken into consideration.

In a step S403, the data transfer unit 212 searches the flow table TB1 by using information contained in the received data packet to identify the mobile terminal 400. As the information to identify the mobile terminal 400, the address of the mobile terminal 400 that is designated as the source address of the data packet may be used. However, there are cases where the access GW 201 receives a data packet from the mobile terminal 400 in an encapsulated state as in the case of 3GPP GPRS and 3GPP EPS. In such cases, information contained in the header of the encapsulated packet (e.g., TEID) may be used as the key information to search the flow table TB1. Further, a combination of a plurality of information elements (e.g., the address and the TEID of the mobile terminal 400) may be used as the identifier of the mobile terminal 400. Next, in a step S404, the data transfer unit 212 determines whether or not there is an entry in the flow table TB1 that matches with the information contained in the received data packet to identify the mobile terminal 400. When a matched entry is found (YES at S404), the data transfer unit 212 performs a process in a step S405. On the other hand, when no matched entry is found (NO at S404), the data transfer unit 212 discards that received data packet and terminates the process (step S406).

In a step S405, the data transfer unit 212 compares the source address, the destination address, the port number, the protocol type, or other data pieces of the received data packet with flow selector information contained in the matched entry in the flow table TB1. In this process, the order of comparisons is determined according to the priority of flow selectors recorded in the flow table TB1. In a step S407, the data transfer unit 212 determines whether or not there is a matched entry as a result of the comparison between the received data packet and the flow selector information in the flow table TB1. When a matched entry is found (YES at S407), the data transfer unit 212 performs a process in a step S408. On the other hand, when there is no matched entry (NO at S407), the data transfer unit 212 discards that received data packet and terminates the process (step S406).

In a step S408, the data transfer unit 212 retrieves the binding ID from the matched entry obtained by the comparison of the flow selector in the step S405, searches the transfer table TB2 by using the retrieved binding ID as a search key, and thereby retrieves the corresponding transfer relevant information. When there are a plurality of binding IDs associated with at least one matched entry in the flow table TB1, the data transfer unit 212 retrieves transfer relevant information for each of the binding IDs.

Next, in a step S409, the data transfer unit 212 determines whether the number of the transfer relevant information pieces obtained in the step S408 is greater than one or not (that is, whether the number of transfer destinations is greater than one or not). When the number of transfer destinations is greater than one (YES at S409), the data transfer unit 212 duplicates the packet according to the number of transfer destinations (step S410). In a step S411, the data transfer unit 212 performs an encapsulating process for the data packet with a header having the source address designating the address of the access GW 201 and the destination address designating the address of the mobility anchor 100 specified in the transfer relevant information retrieved in the step S408, and transmits the encapsulated data packet to the network 10. Note that if the transfer relevant information includes information to distinguish the transmission path in a more detailed manner, such as TEID and GRE key, that information may be set in the header when the data packet is encapsulated. For example, in the case of 3GPP system using GTP in the access GW (corresponding to S-GW) and the mobility anchor (corresponding to P-GW), TEID is used in the encapsulating process. In the case of 3GPP system using PMIPv6, GRE key is used in the encapsulating process.

In a step S412, the data transfer unit 212 decapsulates the encapsulated packet sent from the mobility anchor 100. Then, the data transfer unit 212 transfers the obtained data packet to the mobile terminal 400 that is set in the destination address of that packet. In this process, if necessary, the data transfer unit 212 may newly encapsulate the data packet and then transfer the newly encapsulated data packet to the mobile terminal 400.

Figure 16:
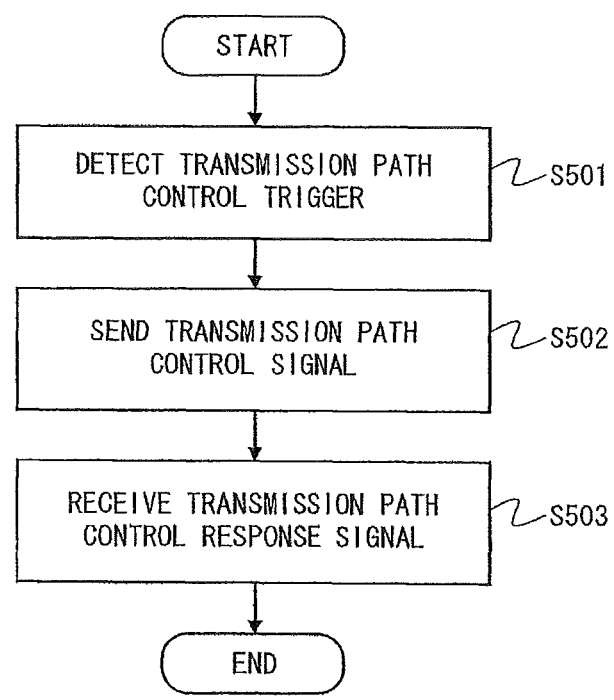
FIG. 16 is a flowchart showing an operation example of a mobility management node according to the first embodiment.

Next, an illustrative operation of the mobility management node 301 relating to the transmission of the transmission-path control signal is explained with reference to a flowchart shown in FIG. 16. In a step S501, in response to detecting that an event triggering the mobility control occurs inside or outside of the mobility management node 301, the control trigger detection unit 310 notifies the control signal processing unit 311 of the occurrence of the event and sends the identifier of the mobile terminal 400 or the identifier of the mobility anchor 100 involved in that event to the control signal processing unit 311.

In a step S502, the control signal processing unit 311 searches the transmission-path information table TB3 by using the identifier of the mobile terminal 400 received from the control trigger detection unit 310, generates the transmission-path control signal by using information in the corresponding entry, and sends the transmission-path control signal to the access GW 201. Specific examples of the generation of the transmission-path control signal are the same as that shown above in the explanation of the control signal processing unit 311.

In a step S503, in response to receiving the transmission-path control response signal from the access GW 201 as a response to the transmission-path control signal transmitted in the step S502, the control signal processing unit 311 updates the contents of the transmission-path information table TB3 based on information stored in that response signal. Examples of the update of the transmission-path information table are the same as that shown above in the explanation of the control signal processing unit 311. If an occurrence of an event has been received from outside the mobility management node 301, the control signal processing unit 311 may communicate the completion of the process to the transmission source of that event, after the completion of the step S503 or the like.

Next, an example of an overall operation of the mobility management system according to this embodiment is explained with reference to a sequence diagram shown in FIG. 17. This example shows a case where while the mobile terminal 400 is communicating with the CN 500 through the access GW 201 and the mobility anchor 100A, the transfer path of a part of the packet flow between the mobile terminal 400 and the CN 500 is switched from the mobility anchor 100A to the mobility anchor 100B. Further, the following situation is assumed in this example.

Identifier of the mobile terminal 400: MN1_ID
Address of the mobile terminal 400: MN1_Addr
Address of the access GW 201: AGW1_Addr
Address of the mobility anchor 100A: Anchor1_Addr
Address of the mobility anchor 100B: Anchor2_Addr
Packet flow to be switched to the mobility anchor 100B:
  Packet flow having destination port number 80 (TCP)
Identifier of the packet flow in the transmission path between the access GW 201 and the mobility anchor 100A: SID_1
Identifier of the packet flow in the transmission path between the access GW 201 and the mobility anchor 100B: SID_2

Firstly, in a step S601, a transmission path (e.g., tunnel) has been already established between the access GW 201 and the mobility anchor 100A, and communication is being performed between the mobile terminal 400 and the CN 500 through that transmission path. At this point, an entry relating to the mobile terminal 400 in the transmission-path information table TB3 held by the mobility management node 301 is the same as that shown in FIG. 11. Further, entries relating to the mobile terminal 400 in the flow table TB1 and the transfer table TB2 held by the access GW 201 are the same as the entries relating to MN1_ID shown in FIGS. 7 and 8 respectively.

Next, in a step S602, as the above-described assumption, an event triggering to change a route of packets corresponding to the destination port number 80 and TCP so as to transferred through the mobility anchor 100B occurs. In response to this event, the mobility management node 301 sends the transmission-path control signal to the access GW 201. The content of the transmission-path control signal in this process is shown below.

Terminal identifier: MN1_ID and MN1_Addr
Source transmission-path information: Anchor1_Addr and SID_1
Target transmission-path information: Anchor2_Addr and SID_2
Transmission-path operation information:
  Flow selector: "Destination port number=80, Protocol=TCP"
  Priority: 1
  Operation information: "Redirect"

In step S603, the access GW 201 determines the necessity of creation or deletion of the transmission-path in response to reception of the transmission-path control signal and sends the transmission-path creation request signal to the mobility anchor 100B. In a step S604, the mobility anchor 100B processes the transmission-path creation request signal and performs configuration for establishing a transmission path between the mobility anchor 100B and the access GW 201. Then, the mobility anchor 100B sends the transmission-path creation response signal to the access GW 201. In this example, assume a case where the mobility anchor 100B has succeeded the transmission path establishment. In a step S605, the access GW 201 receives the transmission-path creation response signal and updates the flow table TB1 and the transfer table TB2. As a result of the process in the step S605, the entries of the flow table TB1 and the transfer table TB2 held by the access GW 201 are updated to those shown in FIGS. 19 and 20 respectively. In a step S606, the access GW 201 sends the transmission-path control response signal to the mobility management node 301. In a step S607, the mobility management node 301 receives the transmission-path control response signal and updates the transmission-path information table TB3.

After that, in a step S608, the mobile terminal 400 performs data communication with the CN 500 including communication using TCP and the destination port number 80. In a step S609, the access GW 201 receives a data packet from the mobile terminal 400. The data transfer unit 212 processes the received data packet in accordance with, for example, a procedure shown in the flowchart in FIG. 15.

Here, assume a case where the access GW 201 has received a TCP packet having the source address designating MN1_Addr and a destination port number 80. In a process corresponding to the step S403 in FIG. 15, the data transfer unit 212 searches the flow table TB1 by using the terminal address (MN1_Addr) or the terminal identifier (MN1_ID) designated as the source address of the received data packet as a search key. At this point, since the flow table TB1 has the entries as shown in FIG. 19, two entries in which the terminal identifier is MN1_ID (in other words, two entries in which the primary flow selector is MN1_Addr) are detected. Further, in a process corresponding to the step S405 in FIG. 15, the data transfer unit 212 performs comparisons between the flow selectors of these two entries and the received data packet. The flow selectors are compared one by one starting from a flow selector having a higher priority (e.g., having a smaller priority value). Therefore, firstly, "dst_port=80, protocol=tcp" is compared with the received data packet. Since they match each other, the matching decision is "YES" in the step S407. Then, in a process corresponding to the step S408 in FIG. 15, the data transfer unit 212 retrieves a binding ID associated with the matched flow selector. In the example shown in FIG. 19, "Binding ID=2" is retrieved. Further, the data transfer unit 212 searches the transfer table TB2 by using this binding ID as a search key. At this point, the transfer table TB2 has the entries as shown in FIG. 20. Therefore, the data transfer unit 212 obtains "Address of mobility anchor=Anchor2_Addr" and "Path identifier=SID_2" as information for transfer (i.e., transfer relevant information). Since there is only one transfer destination, the data transfer unit 212 does no need to duplicate the data packet.

In a process corresponding to the step S411 in FIG. 15, the data transfer unit 212 encapsulates the data packet. In the case of this example, the encapsulating header has the source address designating the address of the access GW 201 and the destination address designating the address of the mobility anchor 100B (Anchor2_Addr). Further, the encapsulating header also has identification information for uplink contained in the path identifier "SID_2". For example, when encapsulating is performed in accordance with 3GPP GTP, TEID for uplink is set in the GTP header. As a result, the encapsulated data packet is tunneled to the mobility anchor 100B as shown in a step S610B in FIG. 17. The mobility anchor 100B transfers a data packet obtained by decapsulating the encapsulated packet to the external network 20 (CN 500).

Figure 17:
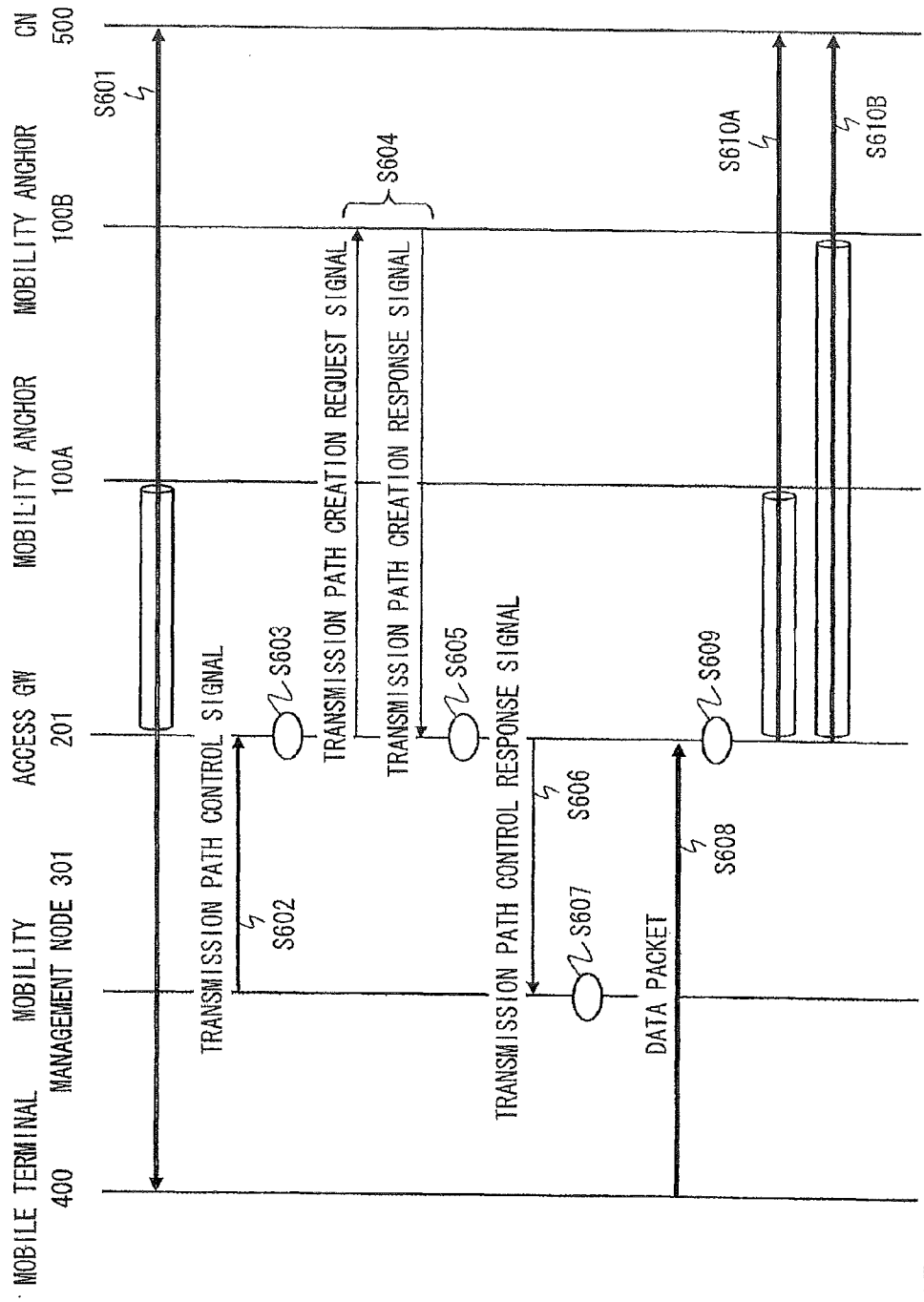
FIG. 17 is a sequence diagram showing an operation example of a mobility management system according to a first embodiment.

Next, in a step S609 in FIG. 17, assume a case where the access GW 201 has received another data packet having the source address designating MN1_Addr and a destination port number not equal to 80. In this case, in the process corresponding to the step S405 in FIG. 15, the data transfer unit 212 determines matching between an entry having a flow selector ("Any") and the received data packet, and retrieves a binding ID associated with the matched flow selector. In the example shown in FIG. 19, "Binding ID=1" is retrieved. Further, the data transfer unit 212 searches the transfer table TB2 by using this binding ID as a search key. At this point, the transfer table TB2 has the entries as shown in FIG. 20. Therefore, the data transfer unit 212 obtains "Address of mobility anchor=Anchor1_Addr" and "Path identifier=SID_1" as information for transfer (i.e., transfer relevant information). Since there is only one transfer destination, the data transfer unit 212 does no need to duplicate the data packet.

In a process corresponding to the step S411 in FIG. 15, the data transfer unit 212 encapsulates the data packet. In the case of this example, the encapsulating header has the source address designating the address of the access GW 201 and the destination address designating the address of the mobility anchor 100A (Anchor1_Addr). Further, the encapsulating header also has identification information for uplink contained in the path identifier "SID_1". For example, when encapsulating is performed in accordance with 3GPP GTP, TEID for uplink is set in the GTP header. As a result, the encapsulated data packet is tunneled to the mobility anchor 100A as shown in a step S610A in FIG. 17. The mobility anchor 100A transfers a data packet obtained by decapsulating the encapsulated packet to the external network 20 (CN 500).

As explained above, the mobility management system according to this embodiment can switch a route of all or some of the data packets that are being transferred through the mobility anchor 100A so as to be transferred through the mobility anchor 100B while continuing the communication between the mobile terminal 400 and the CN 500, without making the mobile terminal 400 take part in the switching. As a result, for example, it facilitates recovery from a failure on the initially-used mobility anchor 100 A and also facilitates distribution of load on the initially-used mobility anchor 100 A.

Figure 18:
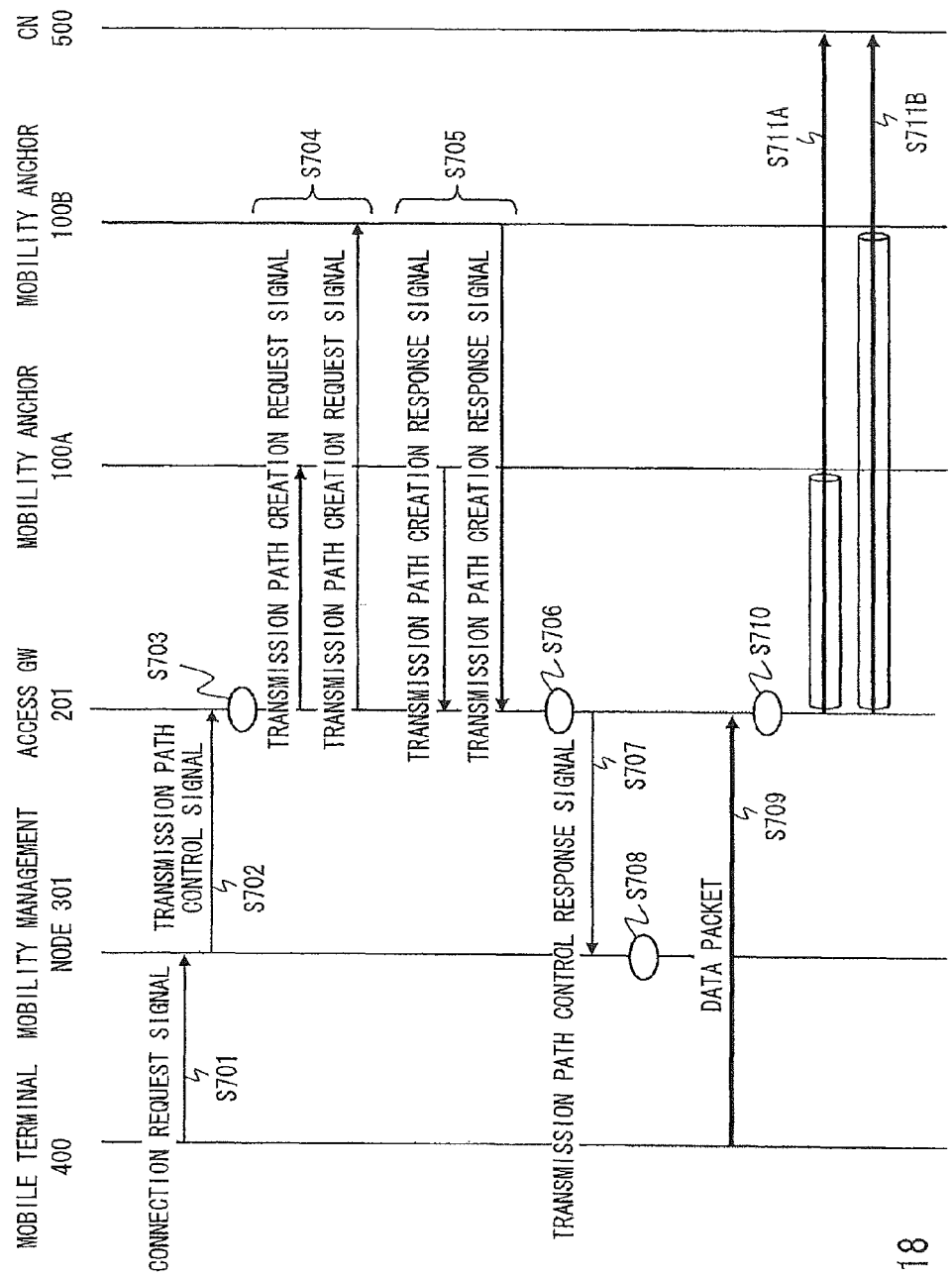
FIG. 18 is a sequence diagram showing an operation example of a mobility management system according to a first embodiment (when the connection of a mobile terminal triggers sending of a transmission-path creation signal)

Note that FIG. 17 shows a case where while a transmission path for the mobile terminal 400 has been already established between the access GW 201 and the mobility anchor (100A), the access GW 201 establishes a new transmission path with another mobility anchor (100B) and switches a route of a part of the packet flow relating to the mobile terminal 400 so as to be transferred through the mobility anchor (100B) is explained. In the following explanation, an example for establishing two transmission paths simultaneously between the access GW 201 and a plurality of mobility anchors (100A and 100B) when the mobile terminal 400 is connected with the network 10 is explained with reference to FIG. 18. Further, in this example, a connection request signal that is sent from the mobile terminal 400 upon connecting with the network 10 is used as a trigger that triggers the mobility management node 301 to send the transmission-path control signal to the access GW 201.

Firstly, in a step S701, the mobile terminal 400 sends the connection request signal to the mobility management node 301. In the case of 3GPP EPS, the connection request signal corresponds to "Attach Request". Further, in the case of 3GPP GPRS, the connection request signal corresponds to "Active PDP Context Request". In a step S702, the mobility management node 301 receives the connection request signal sent from the mobile terminal 400. Then, the control trigger detection unit 310 of the mobility management node 301 uses this connection request signal as a trigger and thereby sends the transmission-path control signal to the access GW 201. This transmission-path control signal includes the addresses of the mobility anchors 100A and 100B, and includes information about transmission paths to be established between the access GW 201 and the mobility anchors 100A and 100B as in the illustrative format of the transmission-path control signal shown in FIG. 6. In this example, assume a case where the mobility anchor 100B transfers a part of packet flows between the mobile terminal 400 and the CN 500 and the mobility anchor 100A transfers the remaining part of the packet flows. Further, assume that the transmission path through the mobility anchor 100A is a source transmission path and the transmission path through the mobility anchor 100B is a target transmission path. Since no packet is duplicated, "Redirect" is set in the transmission-path operation information for the transmission path to the mobility anchor 100B.

In a step S703, the access GW 201 performs a transmission-path creation/deletion process in accordance with, for example, a procedure shown in the flowchart in FIG. 14. As a result, the access GW 201 sends the transmission-path creation request signal to the mobility anchors 100A and 100B by using the information, contained in the transmission-path control signal, about two transmission paths to be established with the mobility anchors 100A and 100B (step S704). In a step S705, the access GW 201 receives the transmission-path creation response signals from the two mobility anchors 100A and 100B as a response to the transmission-path creation request signal. In a step S706, the access GW 201 updates the flow table TB1 and the transfer table TB2 in response to reception of the transmission-path creation response signals. In a step S707, the access GW 201 sends the transmission-path control response signal to the mobility management node 301. In a step S708, the mobility management node 301 receives the transmission-path control response signal and updates the transmission-path information table TB3. The processes in steps S709, S710, S711A and S711B are equivalent to those in the steps S608, S609, S610A and S610B, and therefore their explanation is omitted here.

Second Embodiment

An overall configuration of a mobility management system according to a second embodiment may be similar to that of the first embodiment shown in FIG. 4. In this embodiment, the configuration and the operation of the access GW 201 is partially different from those of the first embodiment. Therefore, the following explanation is made with emphasis on the differences of the configuration and the operation of the access GW 201 from those of the first embodiment.

Figure 22:
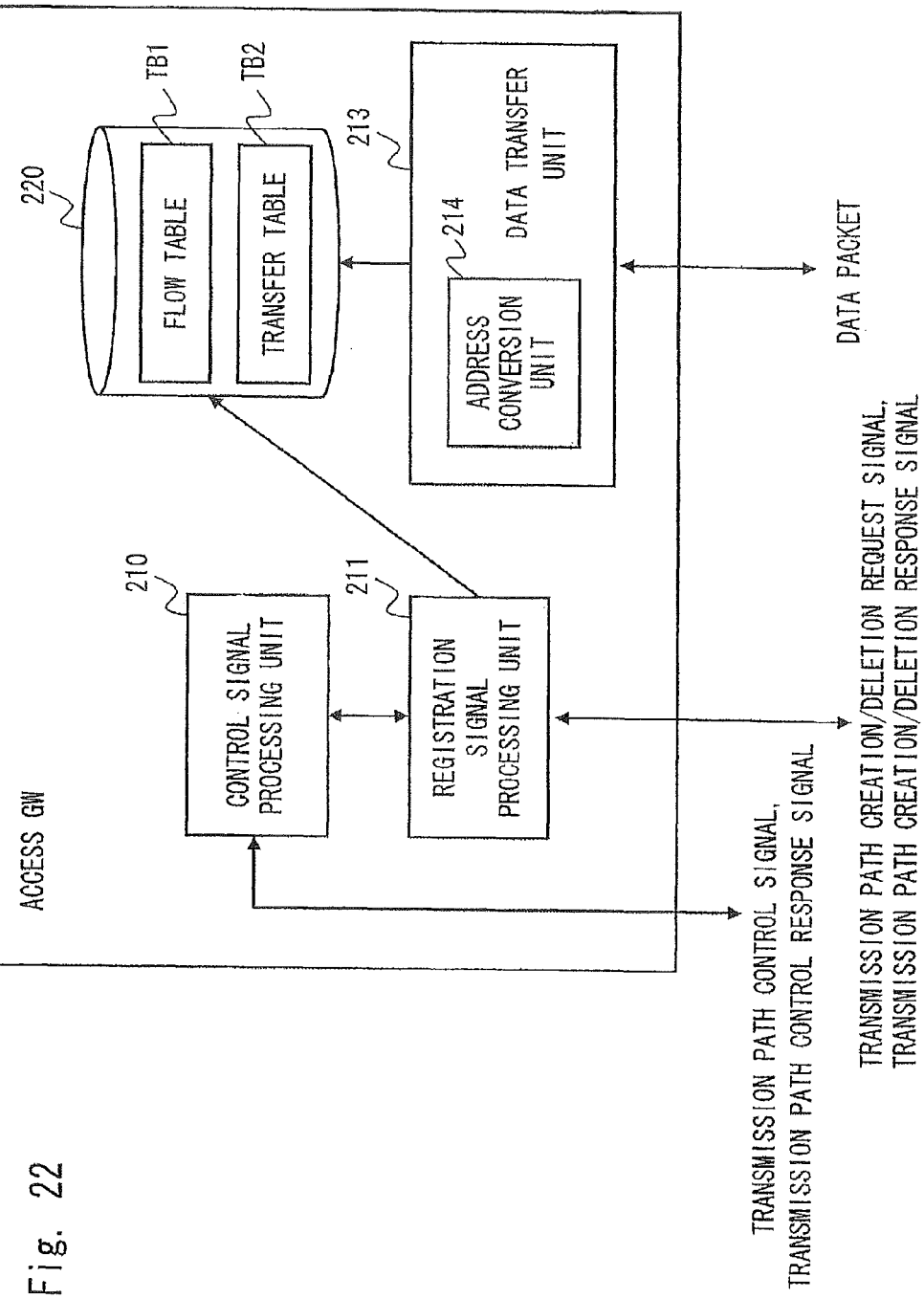
FIG. 22 is a diagram showing a configuration example of an access GW according to a second embodiment.

FIG. 22 is a block diagram showing a configuration example of an access GW 201 according to this embodiment. A data transfer unit 213 included in the access GW 201 according to this embodiment has the function of the above-described data transfer unit 212 and further has an address conversion unit 214. The address conversion unit 214 is capable of converting, while encapsulating a data packet received from the mobile terminal 400, the address of the mobile terminal 400, which has been added to the data packet as the source address, into a different address (i.e., an address to reach the substitute mobility anchor). With this configuration, the selection flexibility of the substitute mobility anchor, to which the data flow of the mobile terminal 400 is switched, increases. For example, in the first embodiment, if the mobile terminal 400 needs to receive the response packet to a packet that the mobile terminal 400 has transmitted to the CN 500 through the substitute mobility anchor, both the substitute mobility anchor and the original mobility anchor need to be disposed on the same subnetwork. In contrast to this, there is no restriction like that in the second embodiment. That is, it is possible to dispose the substitute mobility anchor in a place far away from the original mobility anchor. Therefore, this embodiment can be also applied for a purpose of reducing (off-loading) the load on the network in which the original mobility anchor is disposed.

An access GW 201 in the second embodiment includes a control signal processing unit 210, a registration signal processing unit 211, a data transfer unit 213, and a storage unit 220. Among them, the control signal processing unit 210 may be similar to that in the first embodiment. The registration signal processing unit 211 in this embodiment has the same function as that of the registration signal processing unit 211 in the first embodiment. Further, when the transmission-path creation response signal received from the mobility anchor 100 contains an address assigned to the mobile terminal 400, the registration signal processing unit 211 in this embodiment sets the obtained address in an alternative address field of the corresponding entry included in the transfer table TB2.

The data transfer unit 213 in this embodiment has the same function as that of the data transfer unit 212 in the first embodiment. Further, as described above, the data transfer unit 213 includes the address conversion unit 214. The address conversion unit 214 is capable of converting the address of the mobile terminal 400 designated as the source address into a different address before encapsulating the received data packet. The data transfer unit 213 determines whether an address conversion should be performed or not. When the address conversion should be performed, the data transfer unit 213 retrieves an address after the conversion from the alternative address field in the transfer table TB2.

FIG. 23 shows a specific example of the transfer table TB2 in this embodiment. The transfer table TB2 in this embodiment has a format that is obtained by adding an alternative address field in the transfer table in the first embodiment. The alternative address field stores an address after the conversion that substitutes for the address of the mobile terminal 400 by the address conversion unit 214. Note that a value "None" in the alternative address field means that no address conversion needs to be performed. However, in order to determine whether an address conversion should be performed, a flag field may be prepared separately from the alternative address field and the necessity of the address conversion may be determined according to the value of the flag field.

Similarly to the data transfer unit 212 in the first embodiment, the data transfer unit 213 retrieves information required at the time of a transfer, such as the address of the mobility anchor 100 as a transfer destination, by using the transfer table TB2. Further, the data transfer unit 213 refers to the alternative address field contained in the transfer table TB2, performs an address conversion for a data packet received from the mobile terminal 400 when necessary, and then performs encapsulation. The data transfer unit 213 performs an address conversion when an address is set in the alternative address field and the address of the mobile terminal 400 designated as the source address of the received data packet is different from the address set in the alternative address field.

Similarly to the first embodiment, the access GW 201 in this embodiment performs transmission-path control in response to receiving the transmission-path control signal from the mobility management node 301. Further, when the transmission-path creation response signal received from the mobility anchor 100 stores the address of the mobile terminal 400 that is newly assigned by the mobility anchor 100, the access GW 201 in this embodiment records this new address into the alternative address field in the transfer table TB2.

The access GW 201 in this embodiment transfers a data packet received from the mobile terminal 400 in a substantially same manner as that in the first embodiment. However, as described above, the access GW 201 in this embodiment retrieves an address set in the alternative address field when the access GW 201 searches the transfer table TB2, and performs an address conversion when this address is different from the source address of the received data packet (i.e., the address of the mobile terminal 400). Further, the access GW 201 in this embodiment converts, after decapsulating an encapsulated data packet sent from the mobility anchor 100, the decapsulated destination address into the address of the mobile terminal 400.

The overall operation of the mobility management system in the first embodiment is explained above with reference to FIG. 17. Assuming that the same conditions as used in that explanation are applied here, the overall operation in the second embodiment becomes similar to that shown in the sequence diagram in FIG. 17. However, the information stored in signals and the details of processes in the step S604 and the subsequent steps are different. Therefore, the following explanation is made with emphasis on these matters.

Firstly, the transmission-path creation response signal in the step S604 includes the address of the mobile terminal 400 assigned by the mobility anchor 100B (in this example, MN1_AltAddr). The operation in which the mobility anchor 100 assigns an address to the mobile terminal 400 has been performed in publicly-known mobility anchors (e.g., GGSN and P-GW in 3GPP, and LMA in PMIPv6). Therefore, even in this case, the mobility anchor 100 does not require any special function.

In a step S605, the access GW 201 extracts the address MN1_AltAddr of the mobile terminal 400 from the received transmission-path creation response signal and records this address in the alternative address field in the transfer table TB2. As a result, the transfer table TB2 is updated as shown in FIG. 24.

After that, in a step S608, assume a situation that the mobile terminal 400 communicates with the CN 500 by using the TCP with the destination port number 80. In a step S609, the data transfer unit 213 refers to the flow table TB1 and the transfer table TB2, converts the source address of the received data packet into the address MN1_AltAddr, encapsulates the received data packet, and transmits the encapsulated packet to the mobility anchor 100B (step S610B). Further, in response to receiving the encapsulated packet from the mobility anchor 100B, the access GW 201 converts the destination address of the data packet obtained by decapsulating the received packet from the address MN1_AltAddr into the address (MN1_Addr) of the mobile terminal 400, and transfers the data packet to the mobile terminal 400.

In contrast to this, when the mobile terminal 400 transmits a different data packet from the TCP packet having the destination port number 80, an entry in which the binding ID is "1" in the transfer table shown in FIG. 24 is referred. Therefore, no address conversion is performed by the address conversion unit 214 and the data packet is transferred to the CN 500 through the mobility anchor 100A while the source address is maintained as "MN1_Addr" (step S610A). As for the data packets that are sent in the opposite direction from the CN 500 to the mobile terminal 400, no address conversion is also performed by the address conversion unit 214.

Third Embodiment

Figure 25:
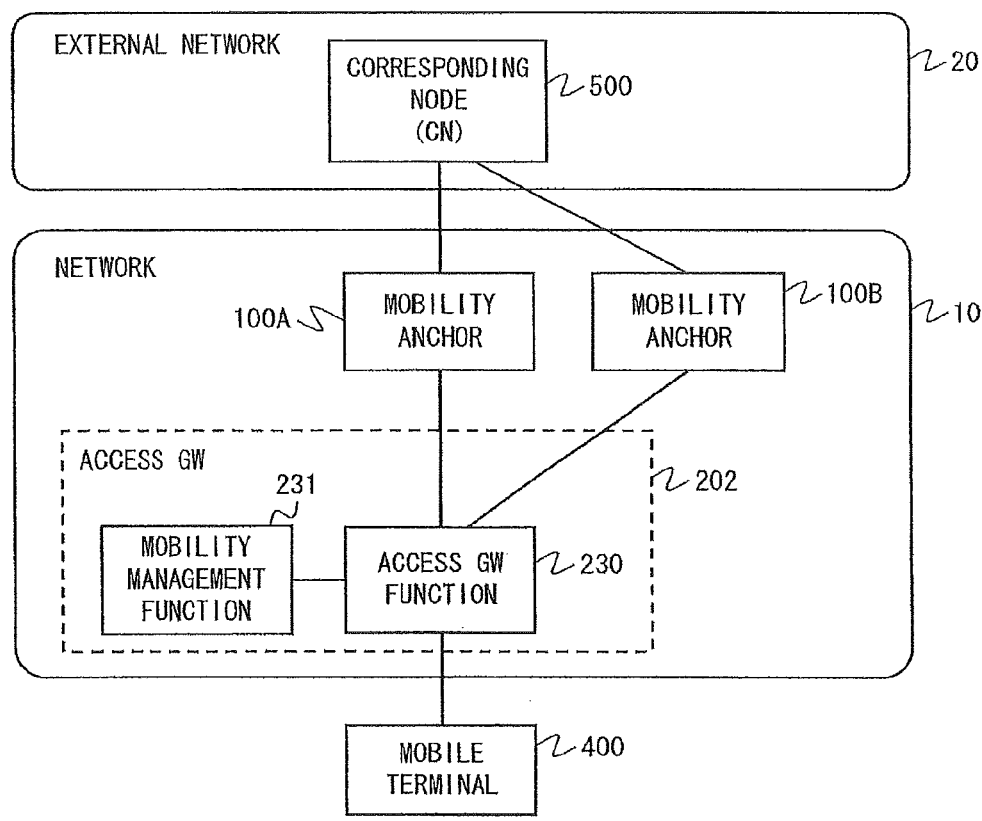
FIG. 25 is a diagram showing a configuration example of an access GW according to a third embodiment.

As a modified example of the first or second embodiment, this embodiment shows an example in which the functions of the mobility management node 301 and the access GW 201 are integrally disposed within one apparatus. FIG. 25 shows a configuration example of a mobility management system according to this embodiment. An access GW 202 shown in FIG. 25 includes an access GW function unit 230 and a mobility management function unit 231. The access GW function unit 230 has a function corresponding to the access GW 201 in the first or second embodiment. The mobility management function unit 231 has a function corresponding to the mobility management node 301 in the first or second embodiment. Communication between the access GW function unit 230 and the mobility management function unit 231 is not sent to any network outside the apparatus, and can use a more efficient communication interface that is internally implemented.

The access GW function unit 230 and the mobility management function unit 231 can be entirely implemented by software. In other words, these functions can be implemented by causing a computer system including a processor such as a CPU and an MPU to execute one or a plurality of programs. However, a part or the whole of these functions can be also configured by hardware.

According to this embodiment, it is possible to provide the functions of the access GW and the mobility management node as one apparatus. As a result, in this embodiment, it is possible to make the communication interface between the access GW function and the mobility management function more efficient. Further, since the hardware resources can be shared or standardized, high performance functions can be provided at a lower cost.

This embodiment is suitable for systems in which the access GW function and the mobility management function are not separated. As an example, 3GPP GPRS corresponds to such a system. In 3GPP GPRS, the access GW 202 in this embodiment corresponds to SGSN.

Fourth Embodiment

Figure 26:
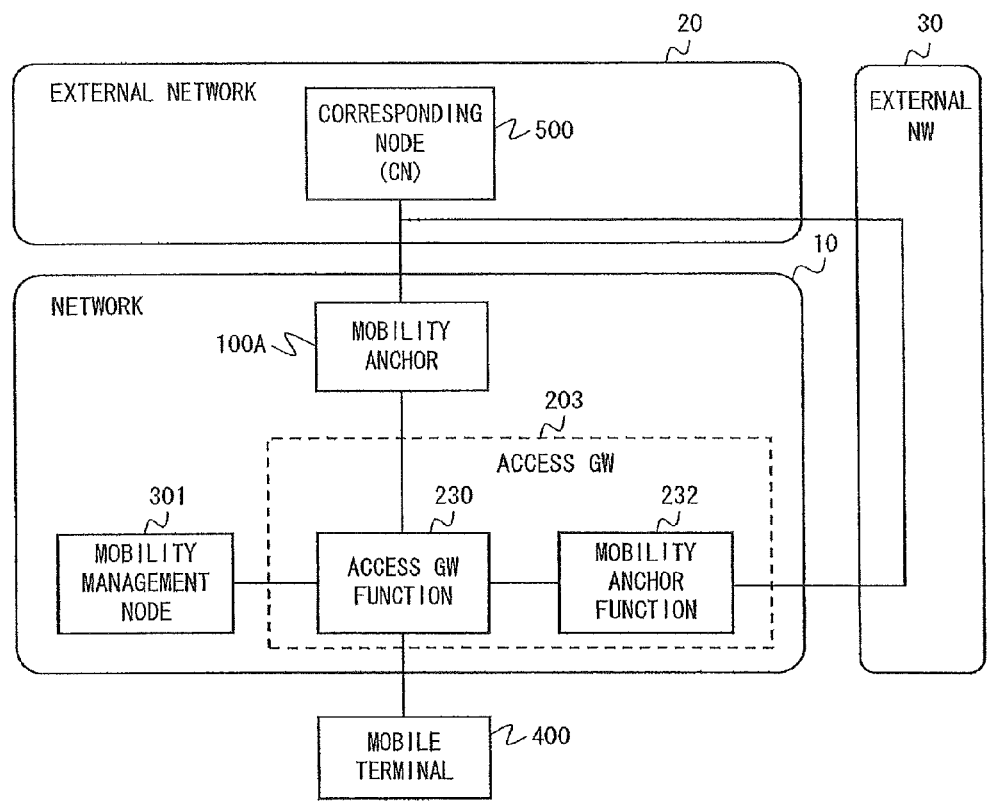
FIG. 26 is a diagram showing a configuration example of an access GW according to a fourth embodiment.

As a modified example of the first or second embodiment, this embodiment shows an example in which the functions of the access GW 201 and the mobility anchor 100 are integrally disposed within one apparatus. FIG. 26 shows a configuration example of a mobility management system according to this embodiment. An access GW 203 shown in FIG. 26 includes an access GW function unit 230 and a mobility anchor function unit 232. The access GW function unit 230 has a function corresponding to the access GW 201 in the first or second embodiment. The mobility anchor function unit 232 has a function corresponding to the mobility anchor 100 in the first or second embodiment and provides an interface to an external network 30. Communication between the access GW function unit 230 and the mobility anchor function unit 232 is not sent to the network outside the apparatus, and can use a more efficient communication interface that is internally implemented. For example, since routing can be internally performed without restraint, processes such as encapsulation can be omitted.

The access GW function unit 230 and the mobility anchor function unit 232 can be entirely implemented by software. In other words, these functions can be implemented by causing a computer system including a processor such as a CPU and an MPU to execute one or a plurality of programs. However, a part or the whole of these functions can be also configured by hardware.

This embodiment facilitates to reduce the load on the mobility anchor 100 disposed in the network 10 or the load on the network 10 by off-loading the traffic of the mobility anchor 100 or the network 10 to the external network 30.

Further, this embodiment can provide the functions of the access GW and the mobility anchor as one apparatus. As a result, in this embodiment, it is possible to make the communication interface between the access GW function and the mobility anchor function more efficient. Further, since the hardware resources can be shared or standardized, high performance functions can be provided at a lower cost.

Fifth Embodiment

Figure 27:
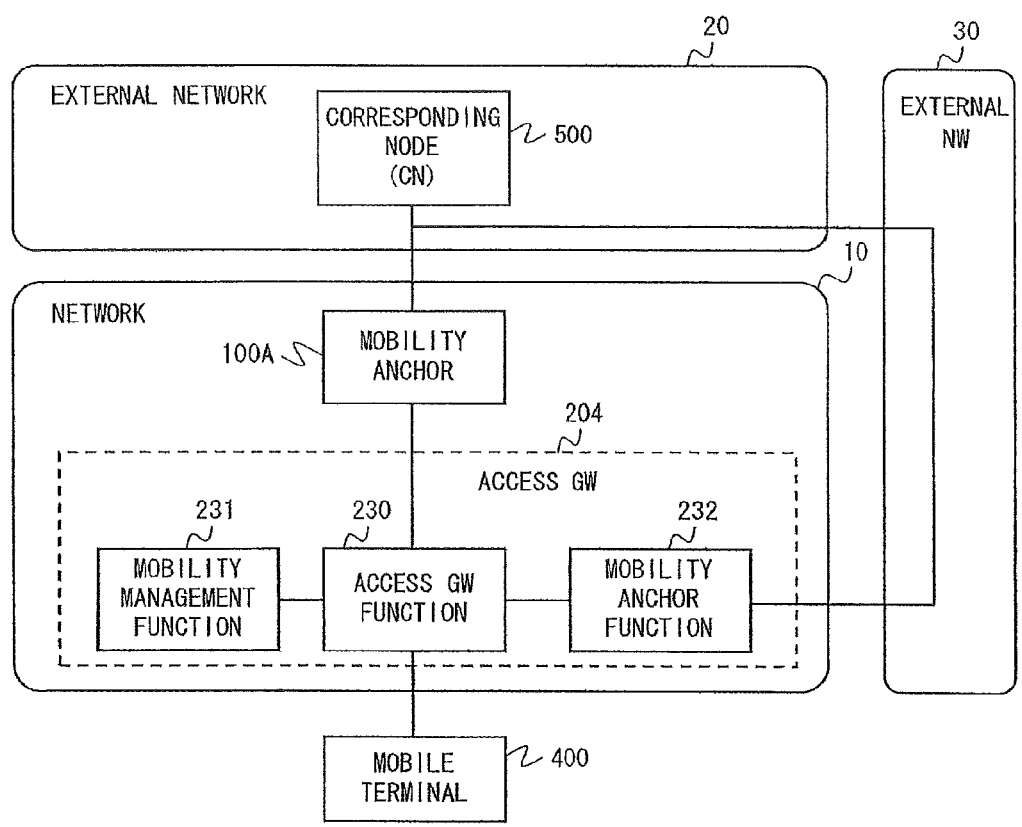
FIG. 27 is a diagram showing a configuration example of an access GW according to a fifth embodiment.

In this embodiment, a combination of the above-described third and fourth embodiments is explained. That is, this embodiment shows an example in which the functions of the access GW 201, the mobility management node 301, and the mobility anchor 100 are integrally disposed within one apparatus. FIG. 27 shows a configuration example of a mobility management system according to this embodiment. An access GW 204 shown in FIG. 27 includes an access GW function unit 230, a mobility management function unit 231, and a mobility anchor function unit 232. The access GW function unit 230, the mobility management function unit 231, and the mobility anchor function unit 232 are already explained above in the third and fourth embodiments, and therefore their explanation is omitted here.

In systems in which the access GW function and the mobility management node function for its control are not separated, this embodiment facilitates to reduce the load on the mobility anchor 100 disposed in the network 10 or the load on the network 10 by off-loading the traffic of the mobility anchor 100 or the network 10.

SUPPLEMENTARY EXPLANATION

Correspondences between elements described in the first to fifth embodiments and node names in actual systems are described hereinafter. However, the following descriptions are mere examples and each embodiment can be applied to systems other than those described below.
(1) 3GPP EPS
P-GW: Mobility anchor 100
S-GW: Access GW 201
MME: Mobility management node 301
L-GW (Local-Gateway, S-G apparatus equipped with traffic off-load function): Access GW 203
UE (User Equipment): Mobile terminal 400
(2) 3GPP CPRS
GGSN: Mobility anchor 100
SGSN: Access GW 202, Access GW 204
L-GW: Access GW 204
UE: Mobile terminal 400
(3) 3GPP2
HA (Home Agent): Mobility anchor 100
AGW (Access Gateway): Access GW 202, Access GW 204
AT (Access Terminal): Mobile terminal 400
(4) WiMAX Forum
HA: Mobility anchor 100

ASN-GW (Access Service Network-Gateway): Access GW 201, Access GW 202

MS (Mobile Station): Mobile terminal 400

Further, the present invention is not limited to the above-described embodiments, and needless to say, various modifications can be made to them without departing from the scope and spirit of the present invention described above.

This application is based upon and claims the benefit of priority from Japanese patent application No. 2011-056243, filed on 15 Mar. 2011, the disclosure of which is incorporated herein in its entirety by reference.

REFERENCE SIGNS LIST

100 MOBILITY ANCHOR
200 ACCESS GW
300 MOBILITY MANAGEMENT NODE
400 MOBILE TERMINAL
500 CORRESPONDING NODE (CN)
201-204 ACCESS GW
210 CONTROL SIGNAL PROCESSING UNIT
211 REGISTRATION SIGNAL PROCESSING UNIT
212, 213 DATA TRANSFER UNIT
214 ADDRESS CONVERSION UNIT
220 STORAGE UNIT
230 ACCESS GW FUNCTION UNIT
231 MOBILITY MANAGEMENT FUNCTION UNIT
232 MOBILITY ANCHOR FUNCTION UNIT
301 MOBILITY MANAGEMENT NODE
310 CONTROL TRIGGER DETECTION UNIT
311 CONTROL SIGNAL PROCESSING UNIT
320 STORAGE UNIT

The invention claimed is:

1. A mobility management system in which mobility management for a mobile terminal is performed, comprising:
a plurality of mobility anchor nodes including first and second mobility anchor nodes, each of the plurality of mobility anchor nodes configured to communicate with an external network;
an access gateway configured to simultaneously communicate with the mobile terminal and with the plurality of anchor nodes, receive data packet flows from the mobile terminal, send a part of the data packet flows to the first mobility anchor node, and send the remaining part of the data packet flows to the second mobility anchor node; and
a control unit having at least one hardware processor configured to execute modules to control the access gateway to switch a destination mobility anchor node of a respective one of the packet flows.

2. The mobility management system according to claim 1, wherein
the access gateway apparatus comprises a control signal processing unit coupled to a mobile terminal, a registration signal processing unit coupled to the control signal processing unit, and a storage unit coupled to both the registration signal processing unit and a data transfer unit.

3. The mobility management system according to claim 1, further comprising
a transmission path establishment unit configured to establish, between the access gateway apparatus and the second mobility anchor node, a logical transmission path for transferring a remaining part of the data packet flow.

4. The mobility management system according to claim 1, wherein
a second embodiment of the access gateway comprises a control signal processing unit coupled to a mobile terminal, a registration signal processing unit coupled to the control signal processing unit, a storage unit coupled to both the registration signal processing unit and a data transfer unit, a address conversion unit coupled to the data transfer unit, and a data transfer unit coupled to the data packet.

5. A method performed in a mobility management system in which mobility management for a mobile terminal is performed, wherein the mobility management system comprises:
a plurality of mobility anchor nodes including first and second mobility anchor nodes, each of the plurality of mobility anchor nodes configured to communicate with an external network;
an access gateway configured to simultaneously communicate with the mobile terminal and with the plurality of anchor nodes, receive data packet flows from the mobile terminal, send a part of the data packet flows to the first mobility anchor node, and send the remaining part of the data packet flows to the second mobility anchor node; and
a control unit,
the method comprising controlling, by the control unit, the access gateway to switch a destination mobility anchor node of a respective one of the packet flows.

6. A non-transitory computer-readable medium storing a program for causing a computer to execute the method according to claim 5.

7. The method performed in a mobility management system in which mobility management for a mobile terminal is performed according to claim 5, further comprising;
receiving, by the access gateway from the control unit, a transmission-path control signal for changing a route of only a part of a data packet flow that pertains to the mobile terminal and is originally transferred through the access gateway and the first mobility anchor node, so as to be transferred through the second mobility anchor node;
establishing, by the access gateway, between the access gateway and the second mobility anchor node, a logical transmission path for transferring the part of the data packet flow, in response to receiving the transmission-path control signal; and
transmitting the part of the data packet flow to the second mobility anchor node from the access gateway and also transmitting a remaining part of the data packet flow to the first mobility anchor node from the access gateway by distinguishing a data packet received from the mobile terminal.

8. A control apparatus used in a mobility management system in which mobility management for a mobile terminal is performed, wherein the mobility management system comprises:
a plurality of mobility anchor nodes including first and second mobility anchor nodes, each of the plurality of mobility anchor nodes configured to communicate with an external network;
an access gateway configured to simultaneously communicate with the mobile terminal and with the plurality of anchor nodes, receive data packet flows from the mobile terminal, send a part of the data packet flows to the first mobility anchor node, and send the remaining part of the data packet flows to the second mobility anchor node; and the control apparatus, the control apparatus comprising at least one hardware processor configured to execute modules comprising a controller configured to control the access gateway to switch a destination mobility anchor node of a respective one of the packet flows.

* * * * *